United States Patent
Murakami et al.

(10) Patent No.: US 10,630,205 B2
(45) Date of Patent: Apr. 21, 2020

(54) RESONANT INVERTER

(71) Applicant: Mitsubishi Electric Corporation, Chiyoda-ku (JP)

(72) Inventors: Satoshi Murakami, Chiyoda-ku (JP); Ryosuke Kobayashi, Chiyoda-ku (JP); Akira Nakagawa, Chiyoda-ku (JP); Kimihiko Tanaya, Chiyoda-ku (JP); Yusuke Naruse, Chiyoda-ku (JP); Yuichi Muramoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 51 days.

(21) Appl. No.: 16/310,231

(22) PCT Filed: Feb. 28, 2017

(86) PCT No.: PCT/JP2017/007788
§ 371 (c)(1),
(2) Date: Dec. 14, 2018

(87) PCT Pub. No.: WO2018/012025
PCT Pub. Date: Jan. 18, 2018

(65) Prior Publication Data
US 2019/0199241 A1    Jun. 27, 2019

(30) Foreign Application Priority Data

Jul. 15, 2016  (JP) .................................. 2016-140106

(51) Int. Cl.
*H02M 1/34*    (2007.01)
*H02M 7/5387*    (2007.01)
*F02P 3/01*    (2006.01)
(Continued)

(52) U.S. Cl.
CPC .......... *H02M 7/53871* (2013.01); *F02P 3/01* (2013.01); *F02P 23/04* (2013.01); *H02M 1/34* (2013.01);
(Continued)

(58) Field of Classification Search
CPC ....... H02M 1/4241; H02M 2007/4818; H02M 2007/4815; H02M 2007/4811;
(Continued)

(56) References Cited

U.S. PATENT DOCUMENTS

2009/0046482 A1 * 2/2009 Smith ............... H02M 3/33569
363/17
2014/0313788 A1 * 10/2014 Okubo .................... H02M 1/12
363/21.01
(Continued)

FOREIGN PATENT DOCUMENTS

| JP | 3514600 B2 | 3/2004 |
| JP | 2015-86702 A | 5/2015 |
| JP | 2015-171174 A | 9/2015 |

OTHER PUBLICATIONS

International Search Report dated Apr. 25, 2017 in PCT/JP2017/007788 filed on Feb. 28, 2017.

*Primary Examiner* — Bryan R Perez
(74) *Attorney, Agent, or Firm* — Oblon, McClelland, Maier & Neustadt, L.L.P.

(57) ABSTRACT

A resonant inverter includes: an input capacitor; an inverter; a snubber circuit; a transformer having a primary winding connected to an AC end of the inverter; a resonant coil, a resonant capacitor, and a current sensor on the secondary winding side of the transformer; and a control unit, wherein, on the basis of current detected by the current sensor, the control unit controls switching elements so as to perform zero voltage switching at the time of turning-on, at a frequency at which a load including the resonant coil and the
(Continued)

resonant capacitor becomes capacitive, and performs power regeneration of energy stored in a snubber capacitor to a DC voltage source.

20 Claims, 21 Drawing Sheets

(51) Int. Cl.
    *F02P 23/04*     (2006.01)
    *H02M 3/335*     (2006.01)
    *H02M 1/00*     (2006.01)

(52) U.S. Cl.
    CPC .............................. *H02M 3/33538* (2013.01); *H02M 2001/0006* (2013.01); *H02M 2001/0058* (2013.01)

(58) Field of Classification Search
    CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 2001/0058; H02M 2001/0009; H02M 2001/0006; H02M 1/34; Y02B 70/1425; Y02B 70/1491
    See application file for complete search history.

(56) References Cited

U.S. PATENT DOCUMENTS

| | | | | |
|---|---|---|---|---|
| 2014/0354073 | A1* | 12/2014 | Sadakata | H02J 17/00 307/104 |
| 2016/0308457 | A1* | 10/2016 | Yuzurihara | H02M 7/48 |
| 2016/0336866 | A1* | 11/2016 | Yamamoto | H02M 1/32 |

* cited by examiner

RESONANT INVERTER

TECHNICAL FIELD

The present invention relates to a resonant inverter applicable to a high-frequency plasma ignition device used for a poor-ignitability combustion engine to perform ignition of the combustion engine.

BACKGROUND ART

In an internal combustion engine such as an automobile engine, measures such as making fuel lean and highly supercharging air are required in order to reduce environmental load substances and improve fuel efficiency. As an ignition device having a higher ignitability, a high-frequency plasma ignition device has been developed in which, after trigger discharge by a spark plug, high-frequency current is applied to obtain a plasma state at high temperature and high pressure to perform ignition.

In a high-frequency plasma ignition device composed of a battery, a full-bridge inverter, a transformer, a resonant circuit, a spark plug, and a high-voltage circuit, it is disclosed that arms in an inverter circuit are shared so that the number of arms becomes less than twice the number of spark plugs (for example, Patent Document 1). In addition, a switching power supply is disclosed in which a snubber circuit is provided for protecting a switching element from surge voltage occurring at the time of switching, a clamp diode is provided between the switching element and an inductor, and energy stored in a capacitor is regenerated to the power supply (for example, Patent Document 2).

CITATION LIST

Patent Document

Patent Document 1: Japanese Laid-Open Patent Publication No. 2015-86702 (paragraphs [0010], [0011], [0027], [0028], and FIGS. 1, 7)

Patent Document 2: Japanese Patent No. 3514600 (paragraphs [0021] to [0023], and FIG. 1)

SUMMARY OF THE INVENTION

Problems to be Solved by the Invention

However, in the invention disclosed in Patent Document 1, a method for protecting a switching element composing the inverter from switching surge is not shown. In the invention disclosed in Patent Document 2, a circuit that performs clamping by a clamp diode in order to prevent withstand-voltage breakdown of the switching element is shown, but there is a problem of causing switching loss every time the switching element is turned on.

The present invention has been made to solve the above problems, and an object of the present invention is to provide a resonant inverter that protects a switching element composing an inverter from switching surge, reduces switching loss at the time of turning-on, and performs power regeneration of energy stored in a snubber capacitor to an input DC voltage source.

Solution to the Problems

A resonant inverter according to the present invention includes: an input capacitor and an inverter which are connected to a DC voltage source; a snubber circuit formed by a series circuit of a regeneration resistor and a snubber capacitor, and connected in parallel to each leg of the inverter; a clamp diode connected between a drain of a switching element of the inverter and a connection point between the regeneration resistor and the snubber capacitor of the snubber circuit; a transformer having a primary winding connected to an AC end of the inverter; a resonant coil, a resonant capacitor, and a current sensor connected to a secondary winding of the transformer; and a control unit for controlling the inverter, wherein on the basis of current detected by the current sensor, the control unit controls the switching element of the inverter so as to perform zero voltage switching at a time of turning-on, at a frequency at which a load including the resonant coil and the resonant capacitor becomes capacitive, and performs power regeneration of energy stored in the snubber capacitor to the DC voltage source.

Effect of the Invention

The resonant inverter according to the present invention includes: the snubber circuit provided to each leg of the inverter; the clamp diode; the transformer having the primary winding connected to the AC end of the inverter; the resonant coil, the resonant capacitor, and the current sensor connected to the secondary winding of the transformer; and the control unit, and the control unit controls the switching element of the inverter so as to perform zero voltage switching, at a frequency at which the load including the resonant coil and the resonant capacitor becomes capacitive, and performs power regeneration of energy stored in the snubber capacitor to the DC voltage source. Therefore, it is possible to protect the switching element composing the inverter from switching surge, reduce switching loss at the time of turning-on, and perform power regeneration of energy stored in the snubber capacitor to the DC voltage source.

DESCRIPTION OF EMBODIMENTS

Embodiment 1

Embodiment 1 relates to a resonant inverter including: a DC voltage source; an input capacitor; a full-bridge inverter; snubber circuits; a transformer having a primary winding connected to an AC end of the inverter; a resonant coil and a resonant capacitor on a secondary winding side of the transformer; a spark plug; a dielectric breakdown power supply; a current sensor; and a control unit, wherein, on the basis of current detected by the current sensor, the control unit controls switching elements so as to perform zero voltage switching at the time of turning-on, at a frequency at which a load including the resonant coil and the resonant capacitor becomes capacitive, and performs power regeneration of energy stored in snubber capacitors to a DC voltage source.

Hereinafter, the configuration and operation of the resonant inverter according to embodiment 1 of the invention of the present disclosure will be described with reference to FIG. 1 which is a configuration diagram of the resonant inverter, FIGS. 2, 3A, and 3B which illustrate the operation, FIG. 4 which illustrates load resonance, FIGS. 5 to 7 which illustrate zero voltage switching, FIGS. 8 to 10 which illustrate power regeneration of surge voltage, FIGS. 11A, 11B, 11C, 12A, and 12B which illustrate reduction of common current, FIG. 13 which illustrates the effect of the snubber circuit, and FIGS. 14 to 16 which illustrate power regeneration of capacitance discharge current at the time of dielectric breakdown of the spark plug.

First, the configuration of the resonant inverter of embodiment 1 will be described with reference to FIG. 1.

The spark plug is mounted to an internal combustion engine such as an automobile engine, and originally, is not a component of the resonant inverter. However, the spark plug is closely related to operation of the resonant inverter, and therefore will be described as a part of the resonant inverter without being specifically discriminated. Similarly, the DC voltage source and the dielectric breakdown power supply may be omitted from the configuration of the resonant inverter.

Figure 1:
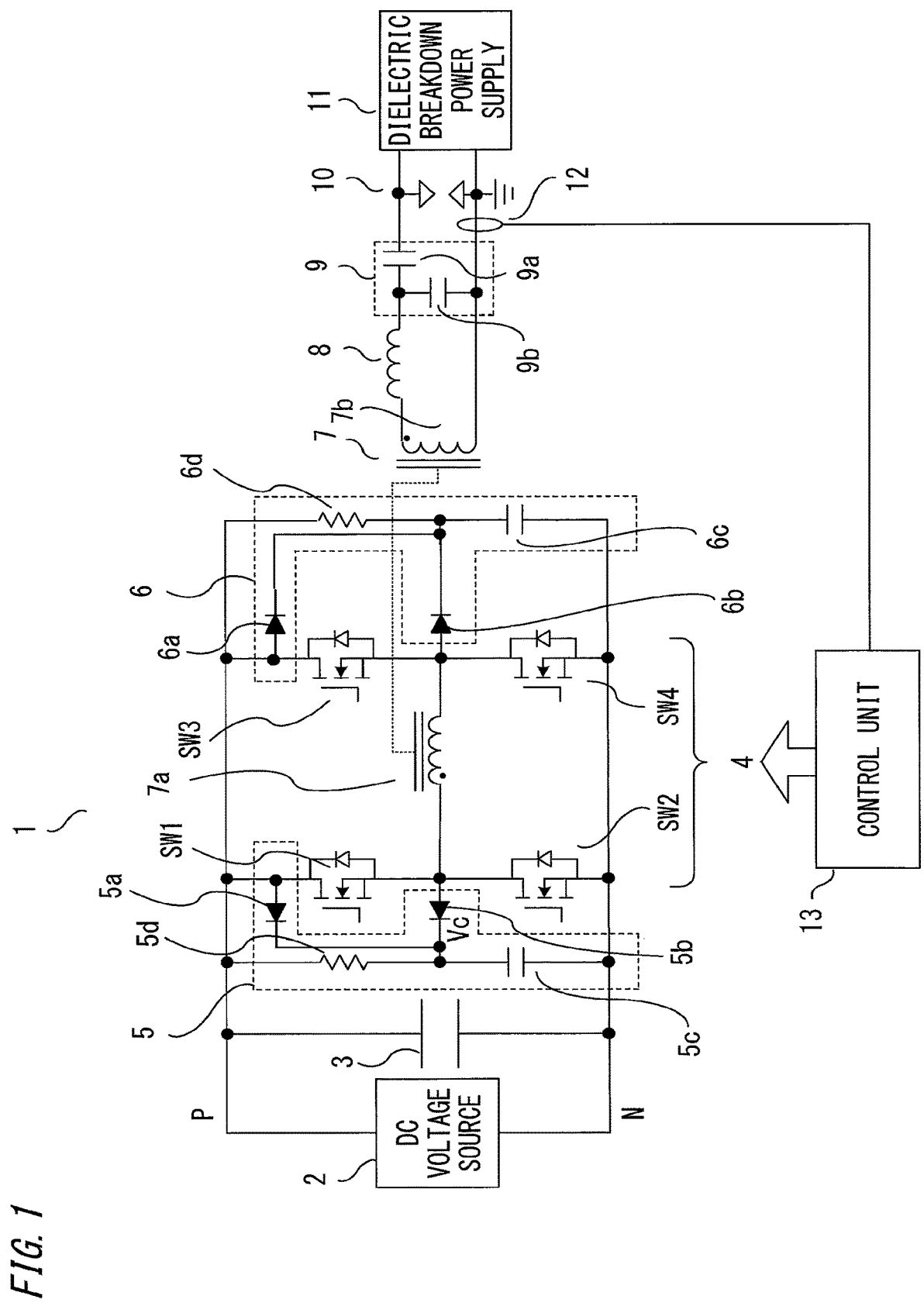
FIG. 1 is a configuration diagram of a resonant inverter according to embodiment 1 of the present invention.

In FIG. 1, a resonant inverter 1 is composed of three parts: a part, on the primary side of the transformer 7, which is mainly configured from a full-bridge inverter 4; a part, on the secondary side of the transformer 7, which is mainly configured from a spark plug 10; and a part relevant to control of the full-bridge inverter 4. It is noted that, hereinafter, the full-bridge inverter 4 may be referred to as inverter 4 as appropriate.

The part on the primary side of the transformer 7, which is mainly configured from the inverter 4, includes a DC voltage source 2, an input capacitor 3, the inverter 4, snubber circuits 5, 6, and a transformer primary winding 7a. The part on the secondary side of the transformer 7, which is mainly configured from the spark plug 10, includes a resonant coil 8 on the secondary side of the transformer 7, a resonant capacitor 9, a spark plug 10, and a dielectric breakdown power supply 11. The part relevant to control of the inverter 4 includes a current sensor 12 for detecting current flowing through the spark plug 10, and a control unit 13.

The inverter 4 is composed of a first leg formed by a series circuit of switching elements SW1 and SW2 and a second leg formed by a series circuit of switching elements SW3 and SW4. The switching elements SW1 to SW4 have antiparallel diodes (body diodes).

The drain ends of the switching elements SW1 and SW3 of the inverter 4 are connected to plus (P) ends of the DC voltage source 2 and the input capacitor 3. The source ends of the switching elements SW2 and SW4 of the inverter 4 are connected to minus (N) ends of the DC voltage source 2 and the input capacitor 3.

DC voltage of the DC voltage source 2 is converted to AC voltage by the inverter 4 through the input capacitor 3. The turns ratio between the transformer primary winding 7a connected to the AC end of the inverter 4, and a transformer secondary winding 7b, is 1:n. Here, n is a real number greater than 1.

Therefore, voltage of the transformer primary winding 7a is converted to n-fold voltage at the secondary winding 7b. Current of the transformer secondary winding 7b is converted to n-fold current at the primary winding 7a.

As the turns ratio n between the transformer primary winding 7a and the transformer secondary winding 7b, an appropriate value is selected in accordance with the specifications of the spark plug 10, the DC voltage source 2, the dielectric breakdown power supply 11, the switching elements of the inverter 4, and the like. For example, n=4.5 is employed.

One end of the transformer secondary winding 7b is connected to one end of the spark plug 10 and the dielectric breakdown power supply 11 via the resonant coil 8 and a first resonant capacitor 9a. The other end of the transformer secondary winding 7b is connected to the other end of the spark plug 10 and the dielectric breakdown power supply 11. The series circuit of the first resonant capacitor 9a and a second resonant capacitor 9b is connected in parallel to the spark plug 10 and the dielectric breakdown power supply 11.

It is noted that the resonant capacitor 9 is composed of the first resonant capacitor 9a and the second resonant capacitor 9b, but they are referred to as resonant capacitor 9 unless needed to be discriminated.

The snubber circuit 5 is composed of a regeneration resistor 5d, a snubber capacitor 5c, and clamp diodes 5a, 5b.

The series circuit of the regeneration resistor 5d and the snubber capacitor 5c is connected in parallel to the series circuit of the switching elements SW1 and SW2 forming the first leg of the inverter 4. The cathodes of the clamp diodes 5a and 5b are connected to the connection point between the regeneration resistor 5d and the snubber capacitor 5c. The anode of the clamp diode 5a is connected to the drain end of the switching element SW1, and the anode of the clamp diode 5b is connected to the drain end of the switching element SW2.

The snubber circuit 6 is composed of a regeneration resistor 6d, a snubber capacitor 6c, and clamp diodes 6a, 6b.

The series circuit of the regeneration resistor 6d and the snubber capacitor 6c is connected in parallel to the series circuit of the switching elements SW3 and SW4 forming the second leg of the inverter 4. The cathodes of the clamp diodes 6a and 6b are connected to the connection point between the regeneration resistor 6d and the snubber capacitor 6c. The anode of the clamp diode 6a is connected to the drain end of the switching element SW3, and the anode of the clamp diode 6b is connected to the drain end of the switching element SW4.

Current flowing through the spark plug 10 is detected by the current sensor 12, and the control unit 13 controls the switching frequency of the inverter 4 so that the current value of the current sensor 12 approaches a predetermined current value. The inverter 4 has a full-bridge configuration including the first leg formed by the switching elements SW1, SW2 and the second leg formed by the switching elements SW3, SW4, and each switching element is formed by a metal oxide semiconductor (MOS) including a diode. However, the inverter 4 is not limited to a full-bridge configuration, and the switching elements may be insulated gate bipolar transistors (IGBT).

Next, the basic operation of the resonant inverter 1, i.e., operation as a high-frequency plasma ignition device will be described with reference to FIG. 2 and FIGS. 3A and 3B. In FIG. 2, A indicates a "plug dielectric breakdown timing", and B indicates "capacitance discharge current from the resonant capacitor".

Figure 2:
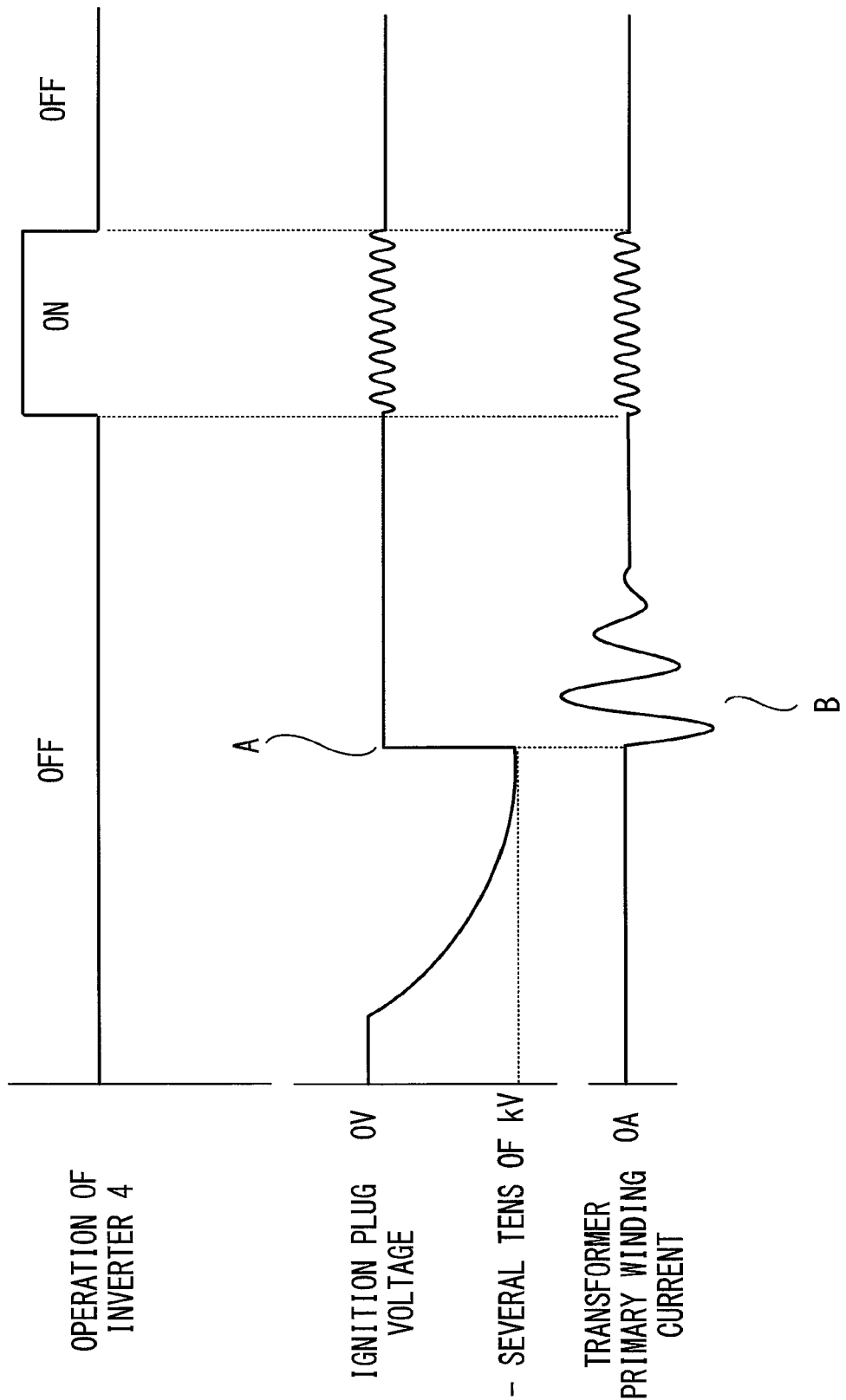
FIG. 2 illustrates operation of the resonant inverter according to embodiment 1 of the present invention.

In FIG. 2, minus voltage is applied to the spark plug 10 from the dielectric breakdown power supply 11, and when the voltage reaches certain voltage, the spark plug 10 undergoes dielectric breakdown and discharges, and capacitance discharge current resonating at a resonant frequency of the resonant coil 8 and the resonant capacitor 9 flows. This current is multiplied by the turns ratio (n) of the transformer 7, and the resultant current flows through the transformer primary winding 7a.

After the resonating capacitance discharge current settles, the inverter 4 is caused to perform switching operation to apply high-frequency current to the spark plug 10.

It is noted that the capacitance discharge current is discharge current caused when energy stored in the resonant capacitor 9 is discharged by dielectric breakdown of a plug electrode part of the spark plug 10.

Figure 3:
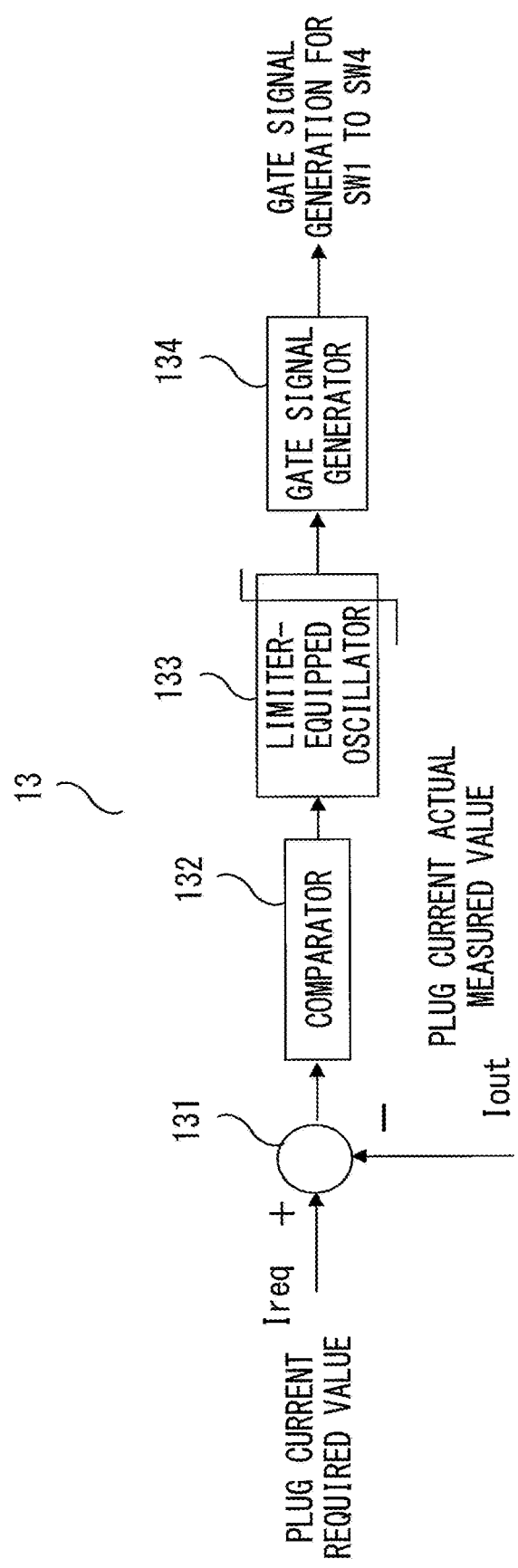
FIG. 3A illustrates operation of the resonant inverter according to embodiment 1 of the present invention.
FIG. 3B illustrates operation of the resonant inverter according to embodiment 1 of the present invention.

FIGS. 3A and 3B illustrates the configuration and operation of the control unit 13, in which FIG. 3A is a configuration diagram of the control unit 13 and FIG. 3B illustrates the operation.

The control unit 13 includes a calculator 131, a comparator 132, a limiter-equipped oscillator 133, and a gate signal generator 134.

The current sensor 12 detects current flowing through the transformer secondary winding 7b, i.e., current of the spark plug 10.

The calculator 131 subtracts detection current Iout from the current sensor 12, from a plug current required value Ireq.

If the detection current Iout which is an actual measured value of plug current is lower than the plug current required value Ireq, the comparator 132 outputs "H". In this case, the limiter-equipped oscillator 133 lowers an inverter-4-driving frequency to be generated. However, the limiter-equipped oscillator 133 is provided with a lower limit, thereby keeping the frequency of the oscillator equal to or higher than the resonant frequency.

It is noted that the gate signal generator 134 receives the output frequency from the limiter-equipped oscillator 133 and generates gate signals for driving the switching elements SW1 to SW4 of the inverter 4.

On the other hand, if the detection current Iout is higher than the plug current required value Ireq, the comparator 132 outputs "L", and the limiter-equipped oscillator 133 increases the frequency to be generated.

Through the above operation, the control unit 13 compares the detection current Iout from the current sensor 12 with the plug current required value Ireq and adjusts the generated frequency of the limiter-equipped oscillator 133, thereby controlling current flowing through the spark plug.

Next, the frequency characteristic and resonance gain of a load including the resonant coil 8 and the resonant capacitor 9 will be described with reference to FIG. 4.

Figure 4:
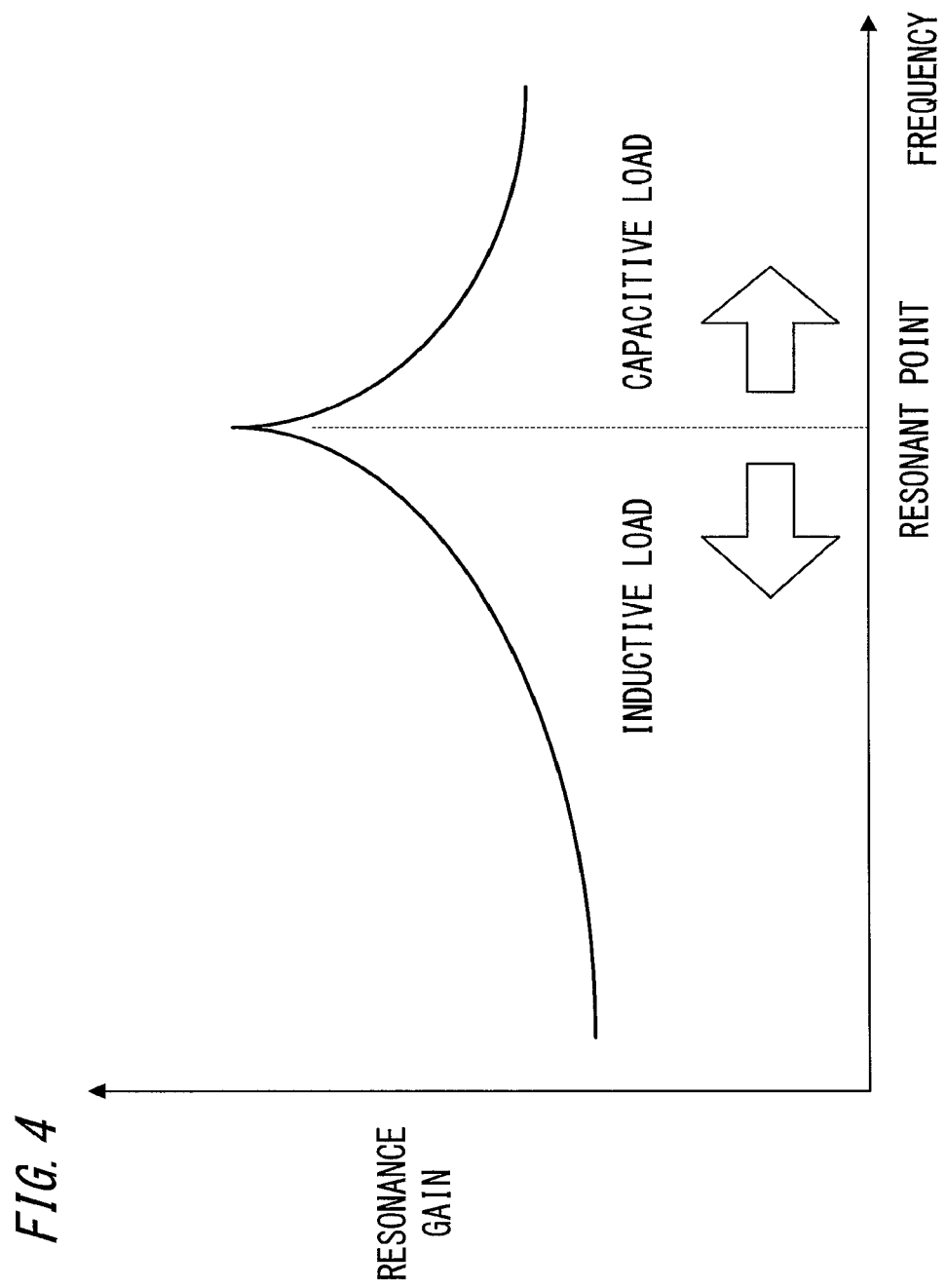
FIG. 4 illustrates load resonance in the resonant inverter according to embodiment 1 of the present invention.

FIG. 4 shows the relationship between a resonant point and the resonance gain of the load including the resonant coil 8 and the resonant capacitor 9. In FIG. 4, at a frequency higher than the resonant point, the load becomes a capacitive load for the inverter 4, and at a frequency lower than the resonant point, the load becomes an inductive load.

In a frequency region higher than the resonant point, the resonance gain decreases as the frequency is increased. In a frequency region lower than the resonant point, the resonance gain increases as the frequency is increased.

As described in FIGS. 3A and 3B, the resonant inverter 1 of embodiment 1 uses the characteristic in the frequency region higher than the resonant point, i.e., the capacitive load frequency region. Through adjustment of the operation frequency of the inverter 4, voltage applied to the spark plug 10 is changed, whereby current flowing through the spark plug 10 is controlled.

Next, zero voltage switching of the switching elements SW1 to SW4 of the inverter 4 at the time of turning-on will be described with reference to FIGS. 5 to 7.

Figure 5:
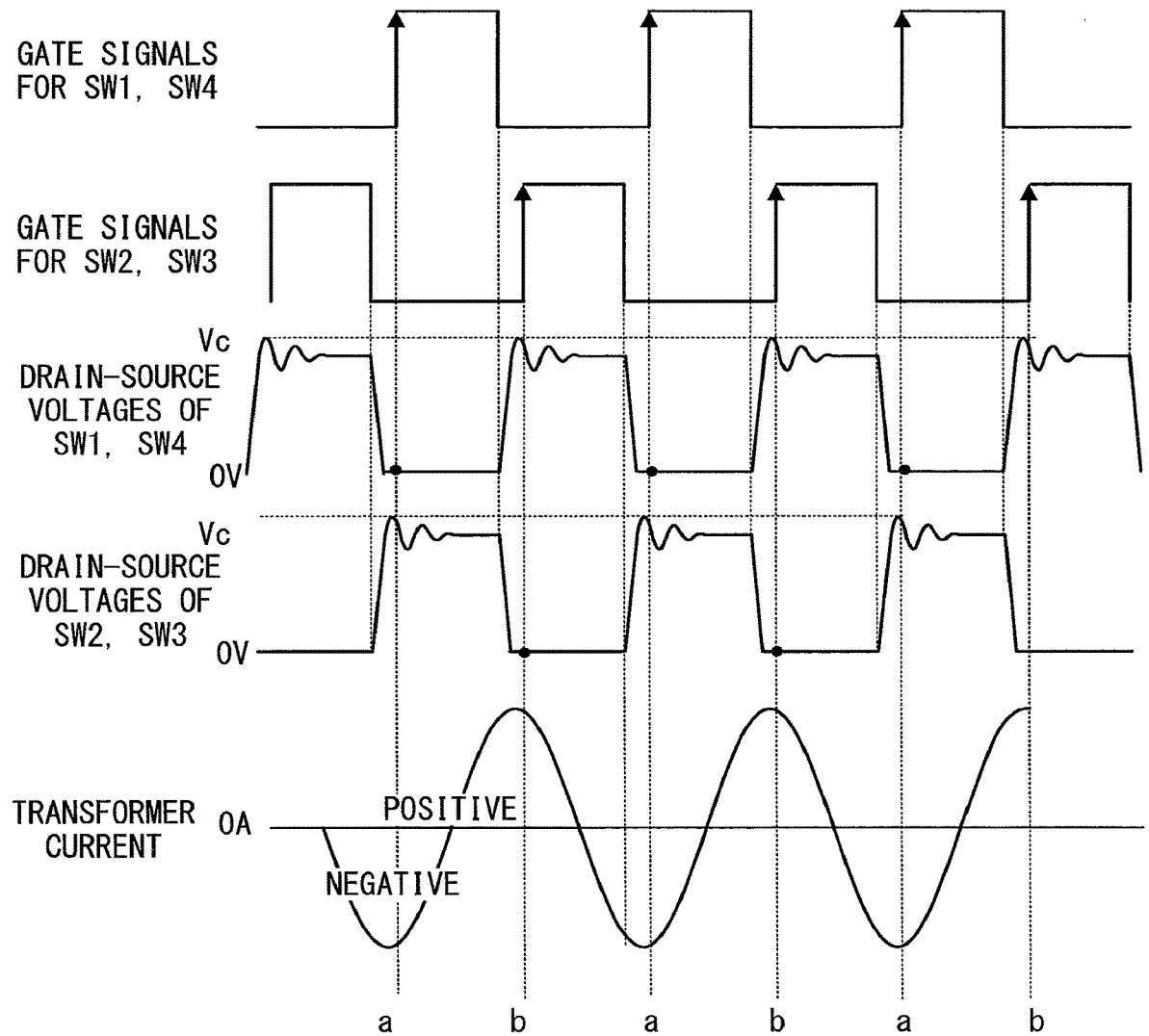
FIG. 5 illustrates zero voltage switching in the resonant inverter according to embodiment 1 of the present invention.

FIG. 5 is a waveform diagram when the inverter 4 is caused to perform switching at a frequency in the capacitive region, and shows gate signals for the switching elements SW1 to SW4, drain-source voltage signals, and current flowing through the transformer primary winding 7a. In FIG. 5, a indicates a timing of rising of the gate signals for the switching elements SW1, SW4, and b indicates a timing of rising of the gate signals for the switching elements SW2, SW3.

Figure 6:
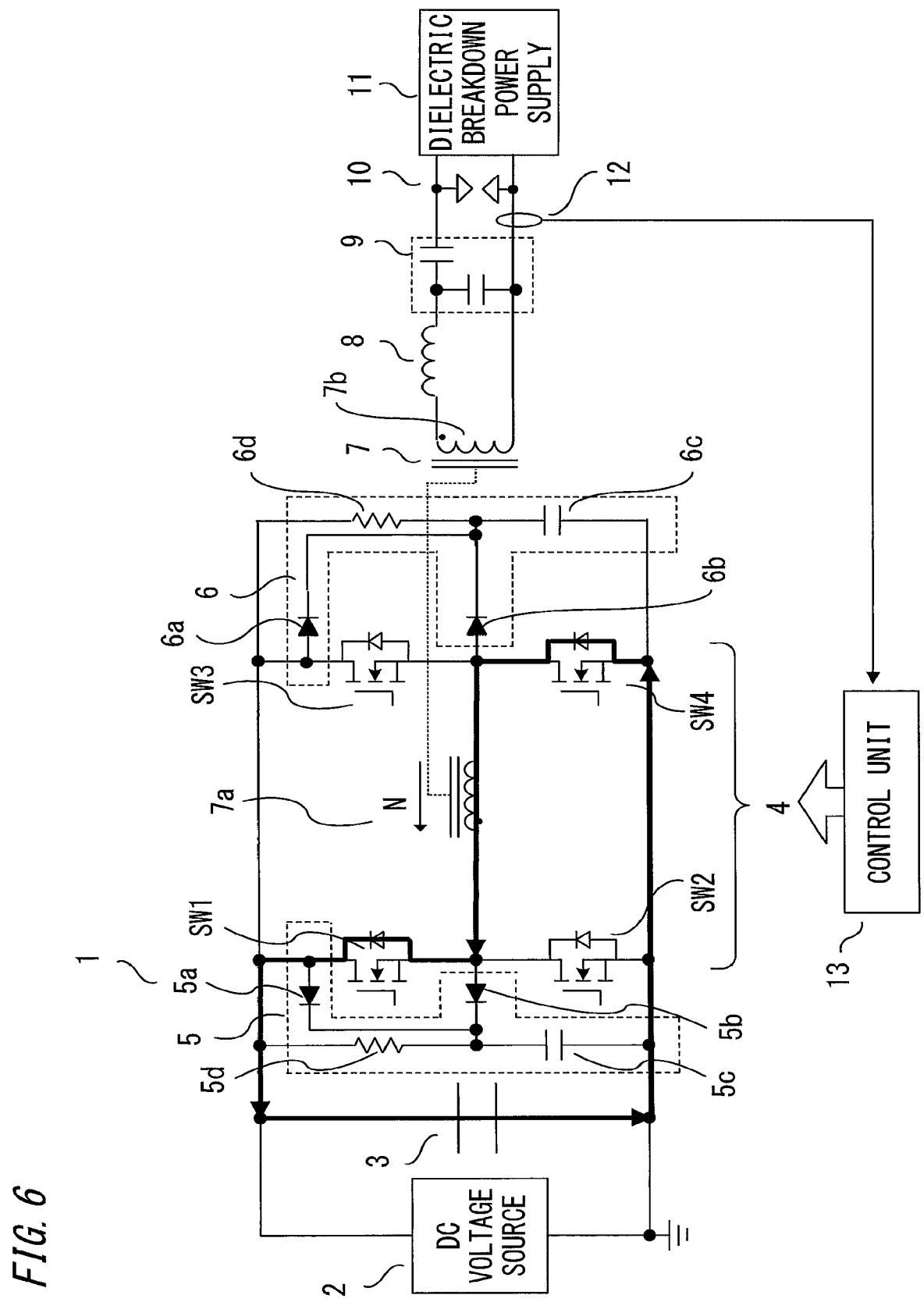
FIG. 6 illustrates zero voltage switching in the resonant inverter according to embodiment 1 of the present invention.
Figure 7:
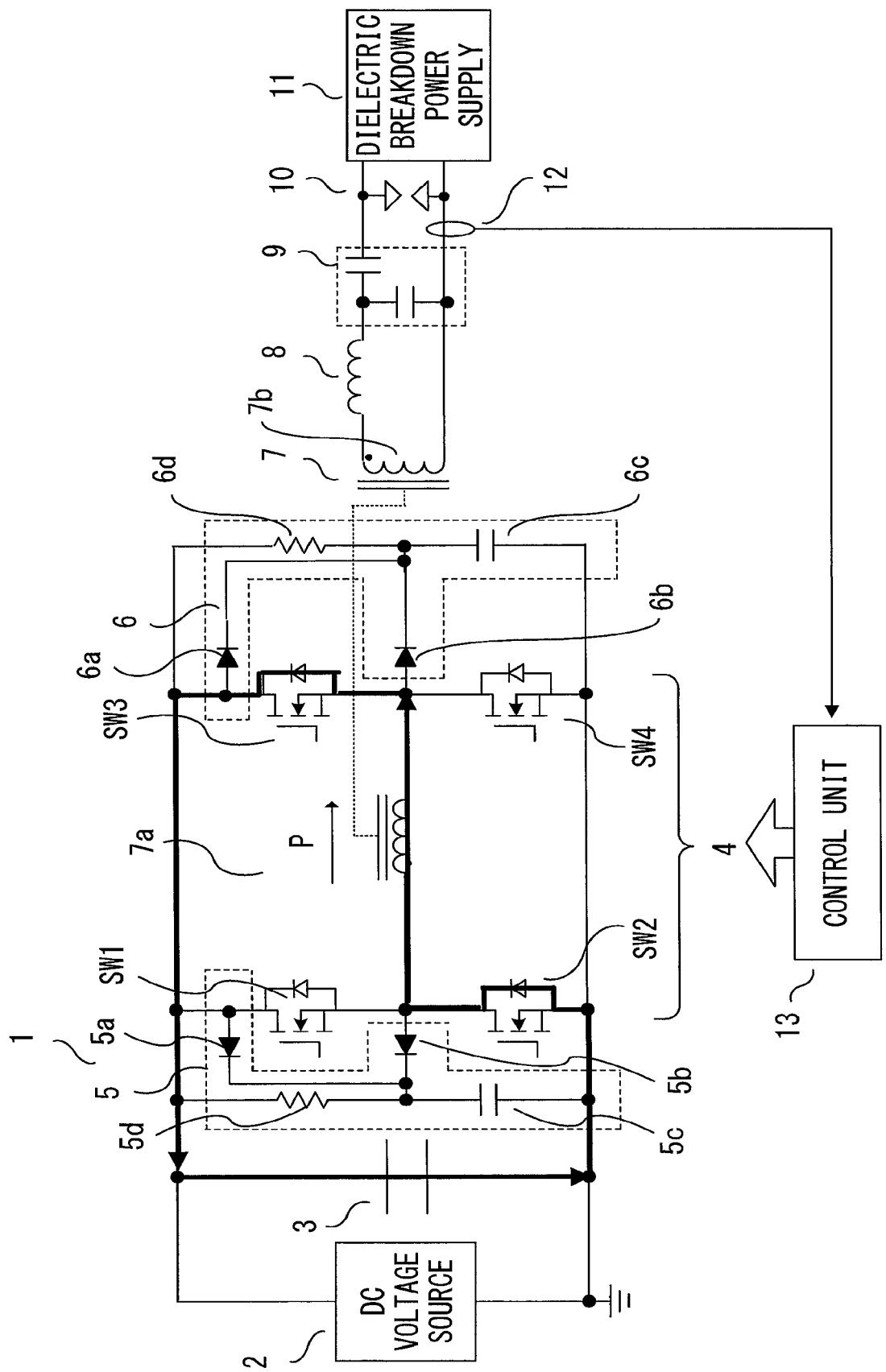
FIG. 7 illustrates zero voltage switching in the resonant inverter according to embodiment 1 of the present invention.

FIG. 6 and FIG. 7 illustrate current flow. FIG. 6 shows current flow in the case where the polarity of current flowing through the transformer primary winding 7a is negative when SW1 and SW3 are turned on, and FIG. 7 shows current flow in the case where the polarity of current flowing through the transformer primary winding 7a is positive when SW2 and SW4 are turned on. In the drawings, P indicates that "the polarity of current is positive", and N indicates that "the polarity of current is negative". The same applies also to the subsequent drawings.

When each switching element SW1 to SW4 composing the inverter 4 is turned on, zero voltage switching is performed, whereby switching loss is suppressed. For this purpose, it is necessary to operate the inverter 4 at a frequency higher than the resonant point of the load including the resonant coil 8 and the resonant capacitor 9, i.e., in the capacitive load region.

If the inverter 4 is operated at a frequency higher than the resonant point of the load including the resonant coil 8 and the resonant capacitor 9, the circuit formed by the resonant coil 8 and the resonant capacitor 9 becomes a capacitive load. Therefore, current flowing through the transformer has a phase leading by 90 degrees relative to the phase of voltage, and voltage and current have polarities different from each other.

In FIG. 5, at the timing a of rising of the gate signals for the switching elements SW1, SW4, the drain-source voltages of the switching elements SW1, SW4 are zero. At the timing b of rising of the gate signals for the switching elements SW2, SW3, the drain-source voltages of the switching elements SW2, SW3 are zero.

As described above, when each switching element SW1 to SW4 is turned on, the voltage between the drain and the source of the switching element being turned on is zero, and thus zero voltage switching is achieved, whereby switching loss can be reduced.

FIG. 6 shows current flow in the case where the polarity of current is negative at the timing a in FIG. 5, i.e., flow of current when the switching elements SW1, SW4 perform switching. FIG. 7 shows current flow in the case where the polarity of current is positive at the timing b in FIG. 5, i.e., flow of current when the switching elements SW2, SW3 perform switching.

In the case of inductive load, the phase of current lags by 90 degrees relative to the phase of voltage. Therefore, each semiconductor is to be turned on in a state in which some voltage remains between the drain and the source of the semiconductor to be turned on. Thus, in the case of inductive load, i.e., in a frequency region lower than the resonant point in FIG. 4, zero voltage switching is not performed when each switching element SW1 to SW4 is turned on. Therefore, in the resonant inverter 1 of embodiment 1, the switching elements SW1 to SW4 are caused to perform switching in a capacitive load region.

Next, power regeneration of surge voltage occurring in the switching elements SW1 to SW4 will be described with reference to FIGS. 8 to 10.

Figure 8:
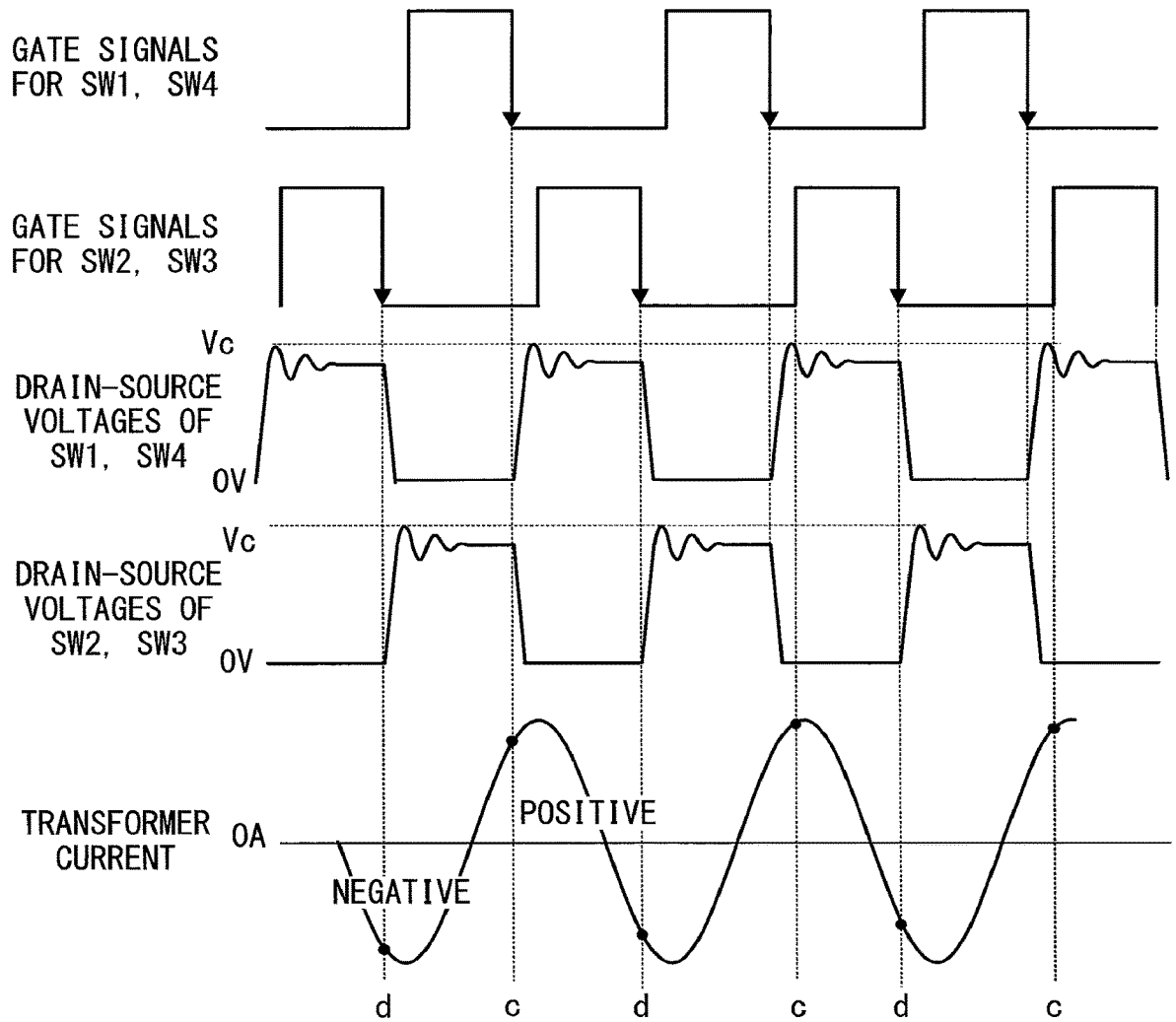
FIG. 8 illustrates power regeneration of surge voltage in the resonant inverter according to embodiment 1 of the present invention.

FIG. 8 is a waveform diagram of the gate signals for the switching elements SW1 to SW4, drain-source voltage signals, and current flowing through the transformer primary winding 7a. In FIG. 8, c indicates a timing of falling of the gate signals for the switching elements SW1, SW4, and d indicates a timing of falling of the gate signals for the switching elements SW2, SW3.

Figure 9:
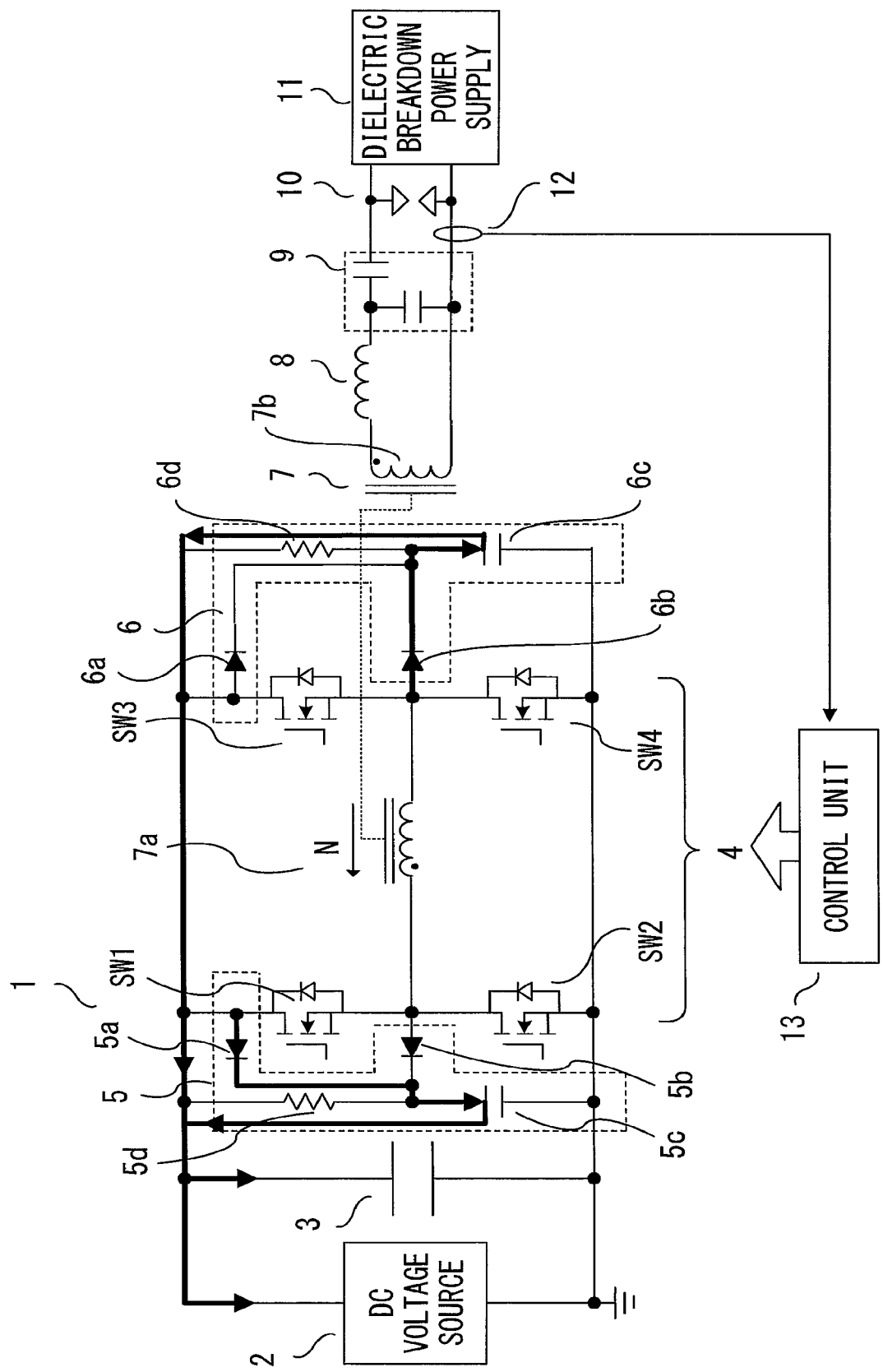
FIG. 9 illustrates power regeneration of surge voltage in the resonant inverter according to embodiment 1 of the present invention.
Figure 10:
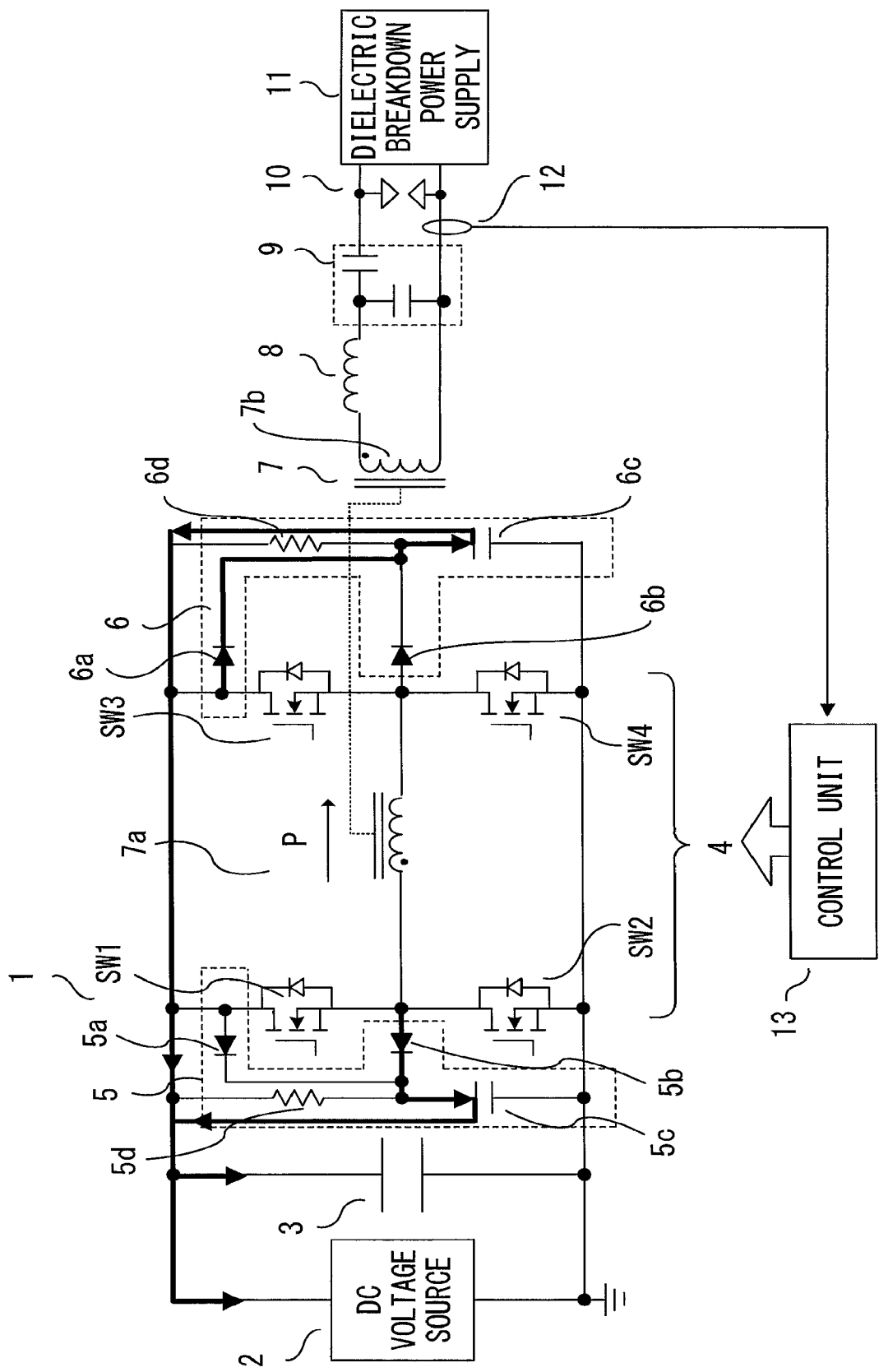
FIG. 10 illustrates power regeneration of surge voltage in the resonant inverter according to embodiment 1 of the present invention.

FIG. 9 and FIG. 10 illustrate current flow. FIG. 9 shows current flow in the case where the polarity of current flowing through the transformer primary winding 7a is negative, and FIG. 10 shows current flow in the case where the polarity of current flowing through the transformer primary winding 7a is positive.

As is found from FIG. 8, each switching element SW1 to SW4 is turned off when the current value is large. Therefore, by influence of parasitic components due to wiring, transformer leakage inductance, and the like, surge or oscillating voltage is likely to occur by resonance.

As shown in FIG. 9, in the case where the polarity of current is negative, voltage occurring at the drain end of the switching element SW1 is clamped by the clamp diode 5a at voltage Vc of the snubber capacitor 5c. The energy stored in the snubber capacitor 5c undergoes power regeneration to the input capacitor 3 and the DC voltage source 2 via the regeneration resistor 5d.

Meanwhile, voltage occurring at the drain end of the switching element SW4 is clamped by the clamp diode 6b at voltage Vc of the snubber capacitor 6c. The energy stored in the snubber capacitor 6c undergoes power regeneration to the input capacitor 3 and the DC voltage source 2 via the regeneration resistor 6d.

As shown in FIG. 10, also in the case where the polarity of current is positive, similarly, voltage occurring at the drain end of the switching element SW3 is clamped by the clamp diode 6a at voltage Vc of the snubber capacitor 6c. The energy stored in the snubber capacitor 6c undergoes power regeneration to the input capacitor 3 and the DC voltage source 2 via the regeneration resistor 6d.

Meanwhile, voltage occurring at the drain end of the switching element SW2 is clamped by the clamp diode 5b at voltage Vc of the snubber capacitor 5c. The energy stored in the snubber capacitor 5c undergoes power regeneration to the input capacitor 3 and the DC voltage source 2 via the regeneration resistor 5d.

Reduction of common current relevant to surge occurring when each switching element SW1 to SW4 is turned off will be described with reference to FIGS. 11A, 11B, and 11C and FIGS. 12A and 12B.

Figure 11A:
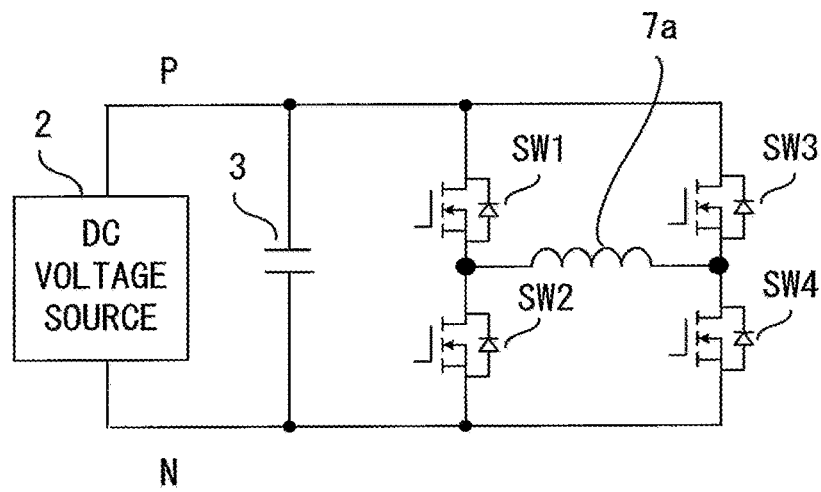
FIG. 11A illustrates reduction of common current in the resonant inverter according to embodiment 1 of the present invention.
Figure 11B:
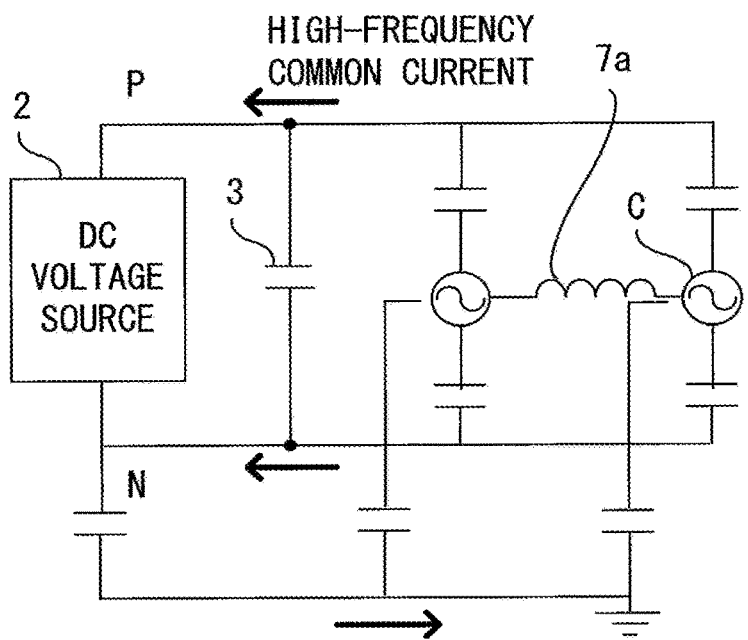
FIG. 11B illustrates reduction of common current in the resonant inverter according to embodiment 1 of the present invention.
Figure 11C:
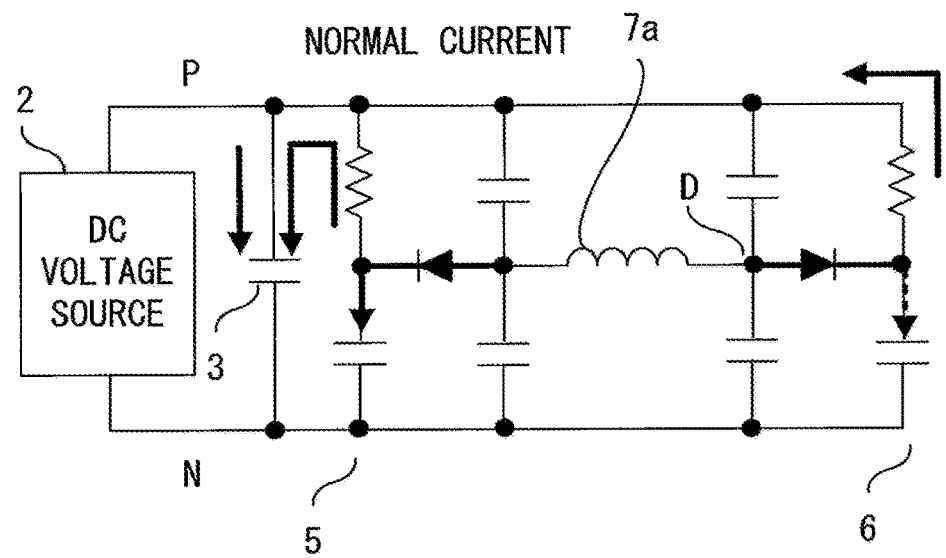
FIG. 11C illustrates reduction of common current in the resonant inverter according to embodiment 1 of the present invention.

FIGS. 11A, 11B, and 11C illustrates the switching elements SW1 to SW4 by modeling them by capacitors between the drains and the sources. FIG. 11A is a basic circuit composed of the DC voltage source 2, the input capacitor 3, and the switching elements SW1 to SW4 of the inverter 4. FIG. 11B and FIG. 11C show the switching elements SW1 to SW4 modeled by capacitors. FIG. 11B shows the case where no snubber circuit is provided to the inverter 4, and FIG. 11C shows the case where the snubber circuits 5, 6 are provided to the inverter 4.

Figure 12A:
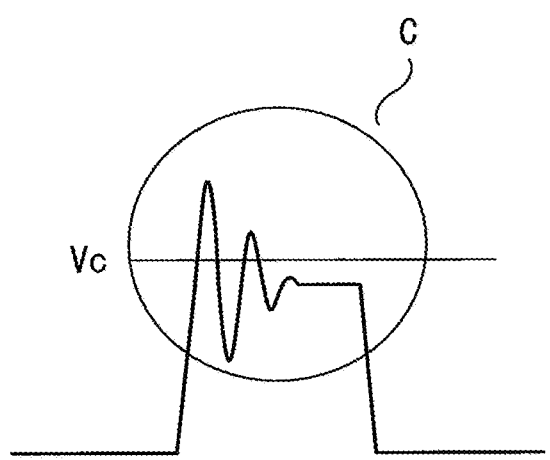
FIG. 12A illustrates reduction of common current in the resonant inverter according to embodiment 1 of the present invention.
Figure 12B:
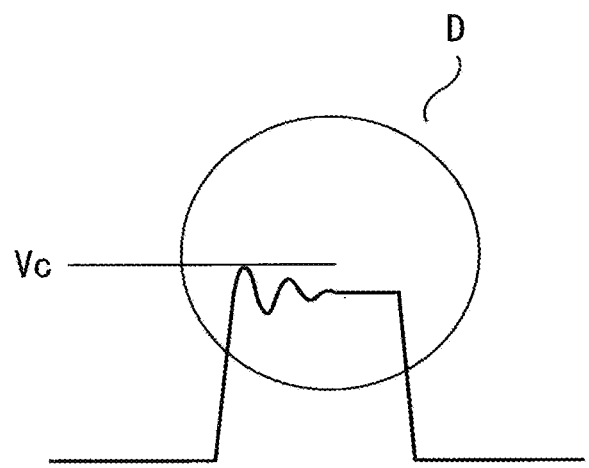
FIG. 12B illustrates reduction of common current in the resonant inverter according to embodiment 1 of the present invention.
Figure 13:
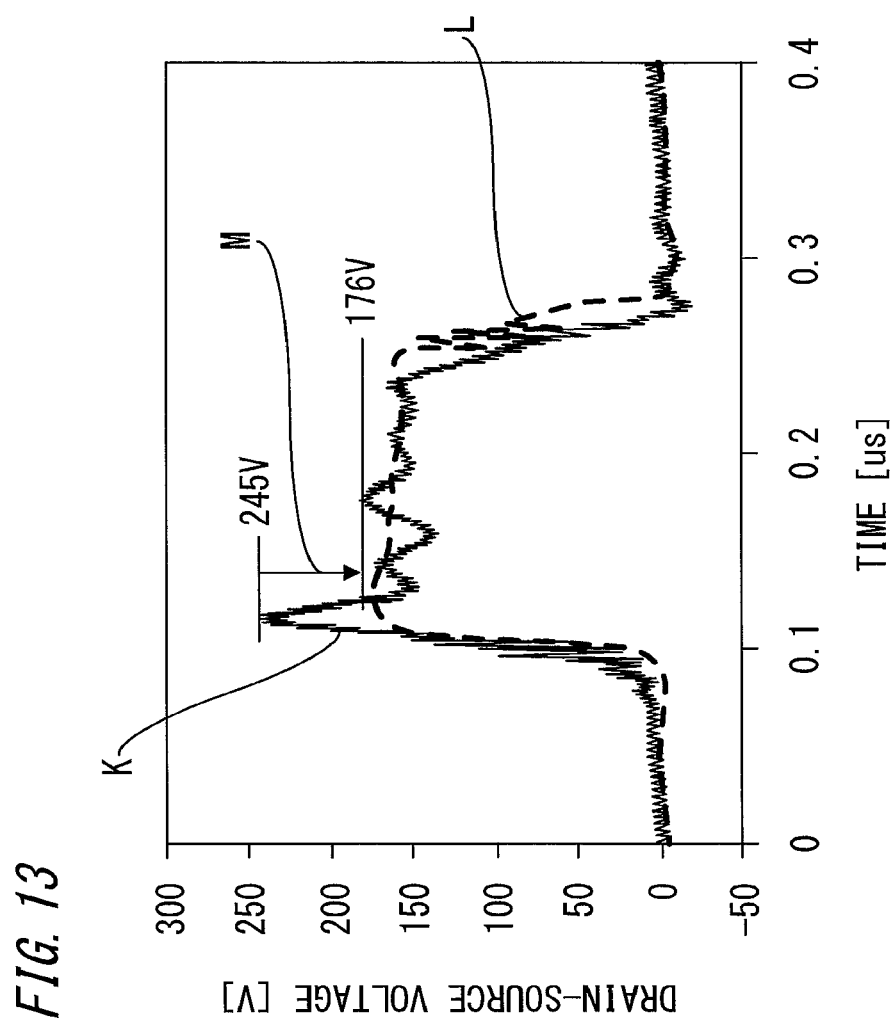
FIG. 13 illustrates an effect of a snubber circuit in the resonant inverter according to embodiment 1 of the present invention.

FIGS. 12A and 12B shows the waveform of voltage occurring between both ends of the capacitor corresponding to the switching element SW4, as an example. FIG. 12A corresponds to FIG. 11B in which the snubber circuits 5, 6 are not provided, and shows the voltage waveform at point C in FIG. 11B. FIG. 12B corresponds to FIG. 11C in which the snubber circuits 5, 6 are provided, and shows the voltage waveform at point D in FIG. 11C.

Here, the effect of the snubber circuits will be described with reference to FIG. 13. FIG. 13 shows a voltage waveform obtained through experiments. In FIG. 13, K indicates a "voltage waveform (solid line) in the case of no snubber circuit", and L indicates a "voltage waveform (dotted line) in the case of providing snubber circuits". M indicates the "amount of reduction by the snubber circuits=69 V".

That is, in the case of no snubber circuit, the peak voltage is 245 V, whereas, in the case of providing snubber circuits, the peak voltage is 176 V, and thus the effect of attenuation by 69 V can be confirmed.

In the case where the snubber circuits 5, 6 are not provided to the inverter 4, as shown in FIG. 11B and FIG. 12A, when each switching element SW1 to SW4 is turned off, high-frequency surge or oscillating voltage occurs at the AC end of the inverter 4. The high-frequency surge or oscillating voltage occurring at the AC end leads to charge/discharge current of the capacitor through the upper and lower arms, so that current in a high-frequency common mode flows to the DC voltage source 2.

On the other hand, in the case where the snubber circuits 5, 6 are provided to the inverter 4, as shown in FIG. 11C and FIG. 12B, high-frequency voltage or oscillating voltage occurring when each switching element SW1 to SW4 is turned off is clamped by the snubber circuit 5, 6 and current flows through the snubber capacitor 5c, 6c, so that current does not flow through the capacitors of the upper and lower arms. Therefore, current flowing in a common mode to the DC voltage source 2 is decreased. That is, providing the snubber circuits 5, 6 converts common current to normal current.

As described above, surge voltage or oscillating voltage occurring when each switching element SW1 to SW4 composing the inverter 4 is turned off is made equal to or smaller than the clamp voltage Vc by the snubber circuits 5, 6, whereby common current can be decreased.

Next, operation of performing power regeneration of capacitance discharge current at the time of spark plug dielectric breakdown, to the input side, will be described with reference to FIGS. 14 to 16.

Figure 14:
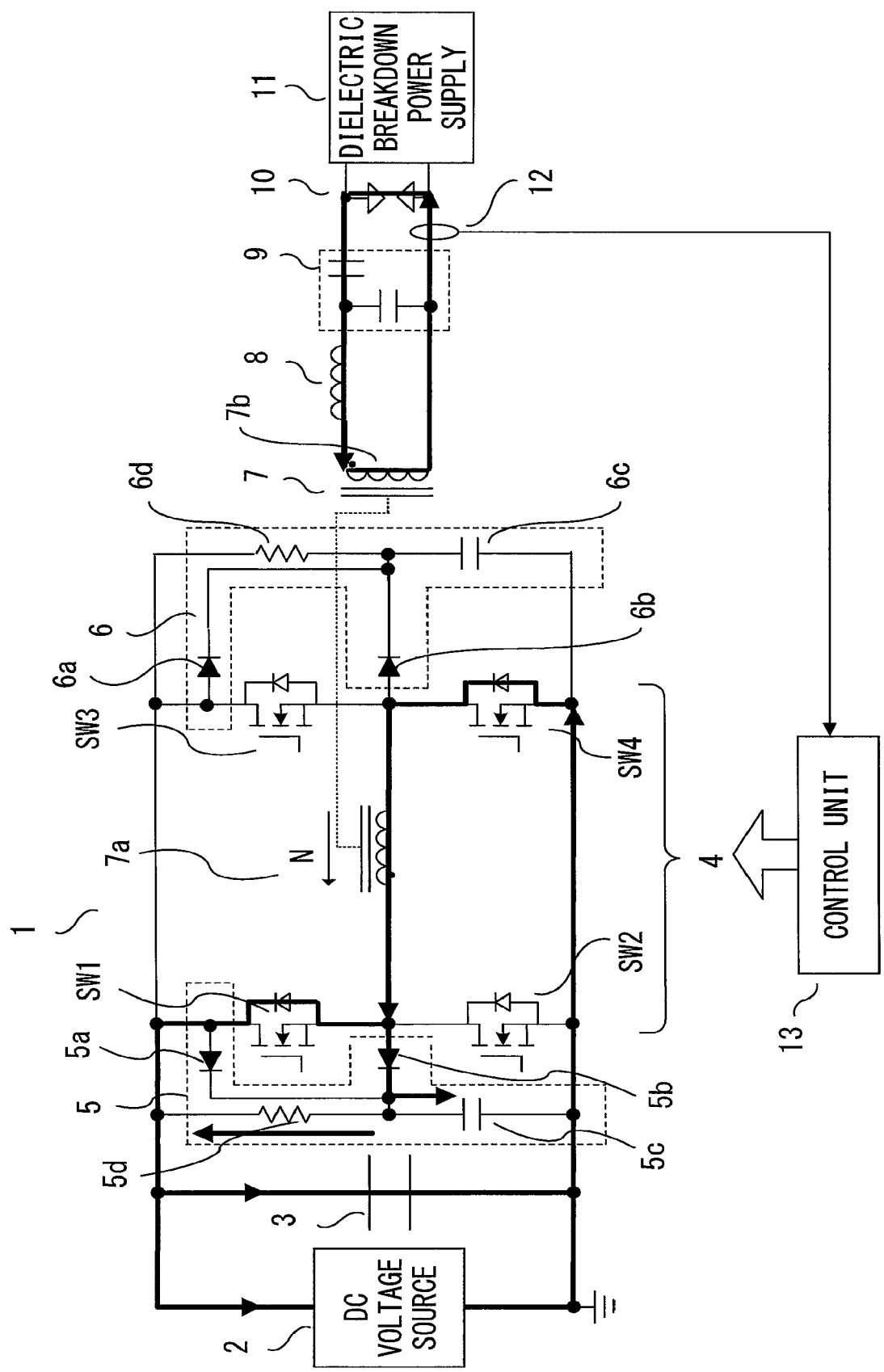
FIG. 14 illustrates power regeneration of capacitance discharge current at the time of dielectric breakdown of a spark plug in the resonant inverter according to embodiment 1 of the present invention.
Figure 15:
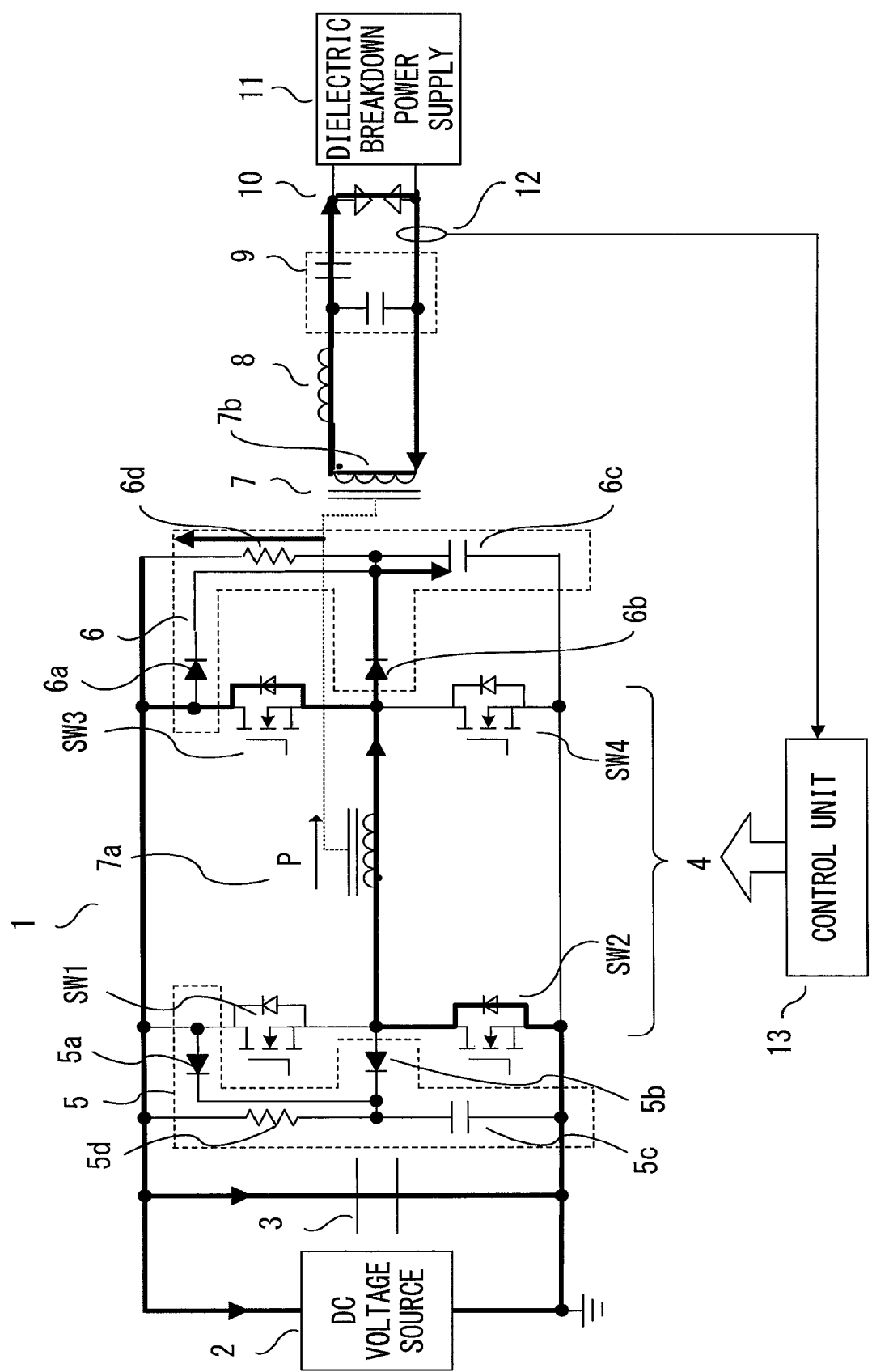
FIG. 15 illustrates power regeneration of capacitance discharge current at the time of dielectric breakdown of the spark plug in the resonant inverter according to embodiment 1 of the present invention.

FIG. 14 shows current flow in the case where current flowing through the transformer primary winding 7a is negative, and FIG. 15 shows current flow in the case where current flowing through the transformer primary winding 7a is positive.

Figure 16:
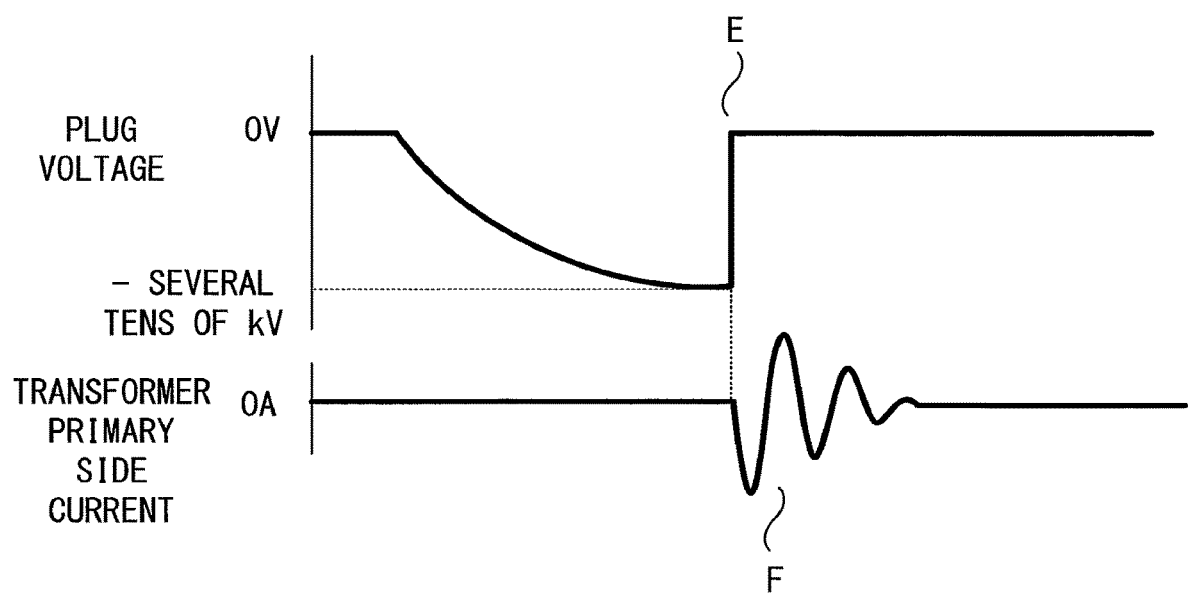
FIG. 16 illustrates power regeneration of capacitance discharge current at the time of dielectric breakdown of the spark plug in the resonant inverter according to embodiment 1 of the present invention.

FIG. 16 shows change in plug voltage applied to the spark plug 10 and change in current of the transformer primary winding 7a, more specifically, change in resonant current due to discharging of the capacitor 9 after plug dielectric breakdown. In FIG. 16, E indicates a "plug dielectric breakdown timing", and F indicates "resonant current due to resonant capacitor discharge".

When the spark plug 10 undergoes dielectric breakdown due to voltage application by the dielectric breakdown power supply 11, energy stored in the spark plug 10 and the resonant capacitor 9 results in capacitance discharge current based on the resonant frequency of the resonant coil 8 and the resonant capacitor 9. The capacitance discharge current flowing through the transformer secondary winding 7b is multiplied by the turns ratio (n) between the transformer primary winding 7a and the secondary winding 7b, and the n-fold current occurs in the transformer primary winding 7a. The capacitance discharge current occurring in the transformer primary winding 7a undergoes power regeneration to the input capacitor 3 and the DC voltage source 2 by the snubber circuits 5 and 6.

In FIG. 14, in the case where the polarity of current in the transformer primary winding 7a is negative, the n-fold capacitance discharge current occurring in the transformer primary winding 7a is divided into current flowing through the body diodes of SW1 and SW4 and current flowing through the clamp diode 5b, the snubber capacitor 5c, and the regeneration resistor 5d, so as to undergo power regeneration to the input capacitor 3 and the DC voltage source 2.

In FIG. 15, in the case where the polarity of current in the transformer primary winding 7a is positive, the n-fold capacitance discharge current occurring in the transformer primary winding 7a is divided into current flowing through the body diodes of SW2 and SW3 and current flowing through the clamp diode 6b, the snubber capacitor 6c, and the regeneration resistor 6d, so as to undergo power regeneration to the input capacitor 3 and the DC voltage source 2.

In FIG. 1, the snubber capacitor 5c is connected to the clamp diodes 5a, 5b, for example. Depending on component arrangement, the wiring distance between the clamp diode 5a and the snubber capacitor 5c may be longer than the wiring distance between the clamp diode 5b and the snubber capacitor 5c. In this case, if another snubber capacitor is connected to the cathode of the clamp diode 5a, the capacitor effect can be improved.

As described above, the resonant inverter of embodiment 1 includes: the DC voltage source; the input capacitor; the full-bridge inverter; the snubber circuits; the transformer having the primary winding connected to the AC end of the inverter; the resonant coil and the resonant capacitor on the secondary winding side of the transformer; the spark plug; the dielectric breakdown power supply; the current sensor; and the control unit, wherein, on the basis of current detected by the current sensor, the control unit controls the switching elements so as to perform zero voltage switching at the time of turning-on, at a frequency at which the circuit formed by the resonant coil and the resonant capacitor becomes a capacitive load, and performs power regeneration of energy stored in the snubber capacitors to the DC voltage source. Therefore, the resonant inverter of embodiment 1 can protect the switching elements composing the inverter from switching surge, reduce switching loss at the time of turning-on, and perform power regeneration of energy stored in the snubber capacitors to the DC voltage source.

Embodiment 2

A resonant inverter of embodiment 2 is obtained by connecting a capacitance discharge current capacitor in parallel to each snubber capacitor in the resonant inverter of embodiment 1.

Figure 17:
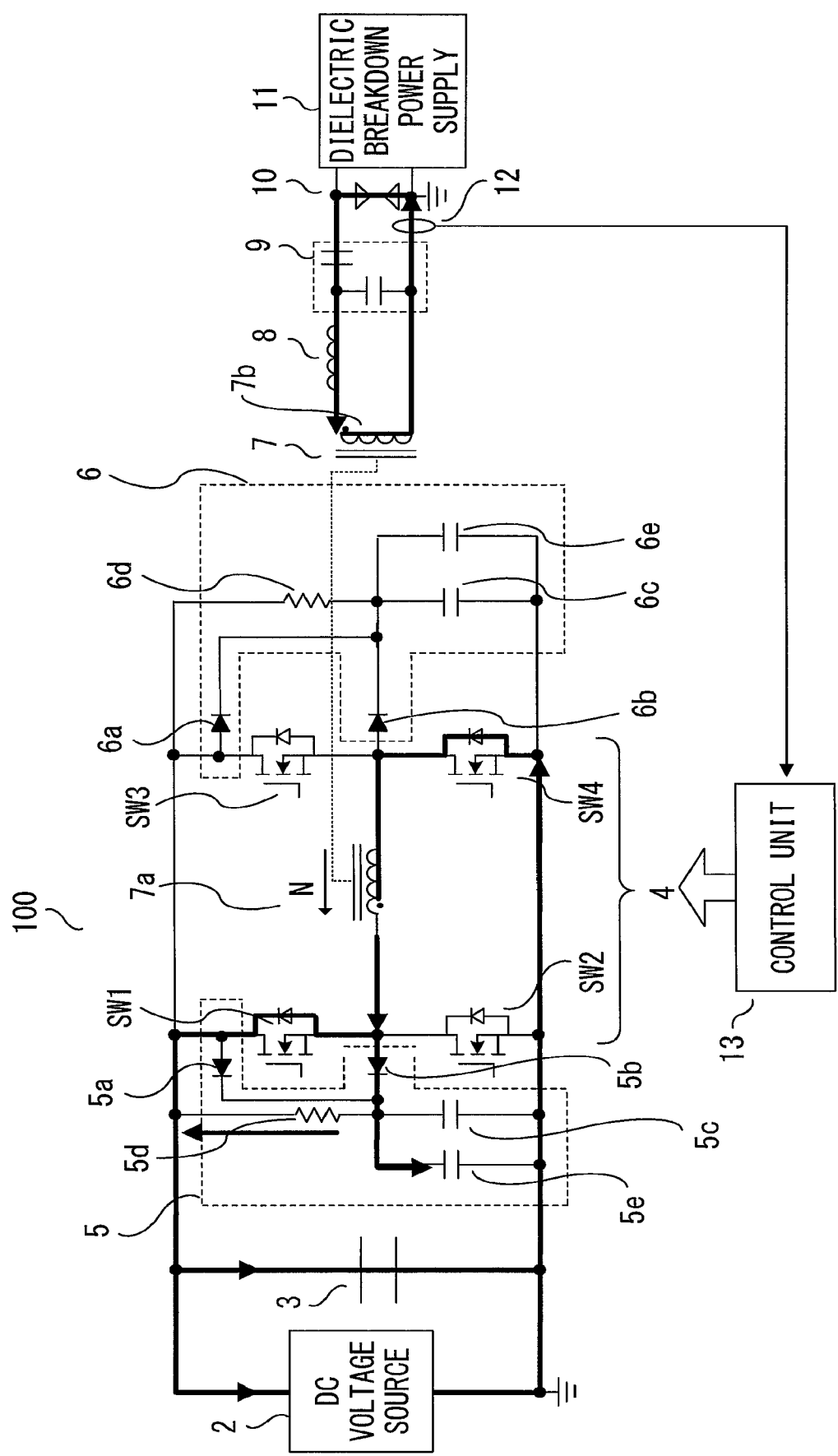
FIG. 17 illustrates the configuration and operation of a resonant inverter according to embodiment 2 of the present invention.

Hereinafter, the resonant inverter of embodiment 2 will be described focusing on difference from embodiment 1, with reference to FIG. 17 which illustrates the configuration and operation. In FIG. 17, parts that are the same as or correspond to those in FIG. 1 in embodiment 1 are denoted by the same reference characters.

First, the configuration of a resonant inverter 100 of embodiment 2 will be described with reference to FIG. 17.

A capacitance discharge current capacitor 5e is connected in parallel to the snubber capacitor 5c, and a capacitance discharge current capacitor 6e is connected in parallel to the snubber capacitor 6c.

When the spark plug 10 undergoes dielectric breakdown and discharges, capacitance discharge current resonating at the resonant frequency of the resonant coil 8 and the resonant capacitor 9 flows, and current multiplied by the turns ratio (n) of the transformer 7 flows through the transformer primary winding 7a.

Surge or parasitic oscillation is oscillation having a higher frequency than the switching frequency of the inverter 4. The snubber capacitors 5c, 6c need to have low impedances with respect to the high-frequency oscillation of surge or parasitic oscillation.

On the other hand, the capacitance discharge current capacitors 5e, 6e connected in parallel to the snubber capacitors 5c, 6c need to have low impedances at the resonant frequency of the resonant coil 8 and the resonant capacitor 9 and have capacitances large enough to absorb current.

It is noted that the frequency of surge or parasitic oscillation is higher than the resonant frequency of the resonant coil 8 and the resonant capacitor 9.

Providing the respective capacitors sharing these functions can prevent the switching elements from undergoing withstand-voltage breakdown by surge or oscillation voltage at the time of switching or by capacitance discharge current.

As described above, the resonant inverter of embodiment 2 is obtained by connecting the capacitance discharge current capacitor in parallel to each snubber capacitor of the resonant inverter of embodiment 1. Therefore, as in the resonant inverter of embodiment 1, it is possible to protect the switching elements composing the inverter from switching surge, reduce switching loss at the time of turning-on, and perform power regeneration of energy stored in the snubber capacitors to the DC voltage source. Further, it is possible to protect the switching elements from capacitance discharge current.

Embodiment 3

A resonant inverter of embodiment 3 is obtained by adding a protection switching element to each snubber circuit of the resonant inverter of embodiment 1.

Figure 18:
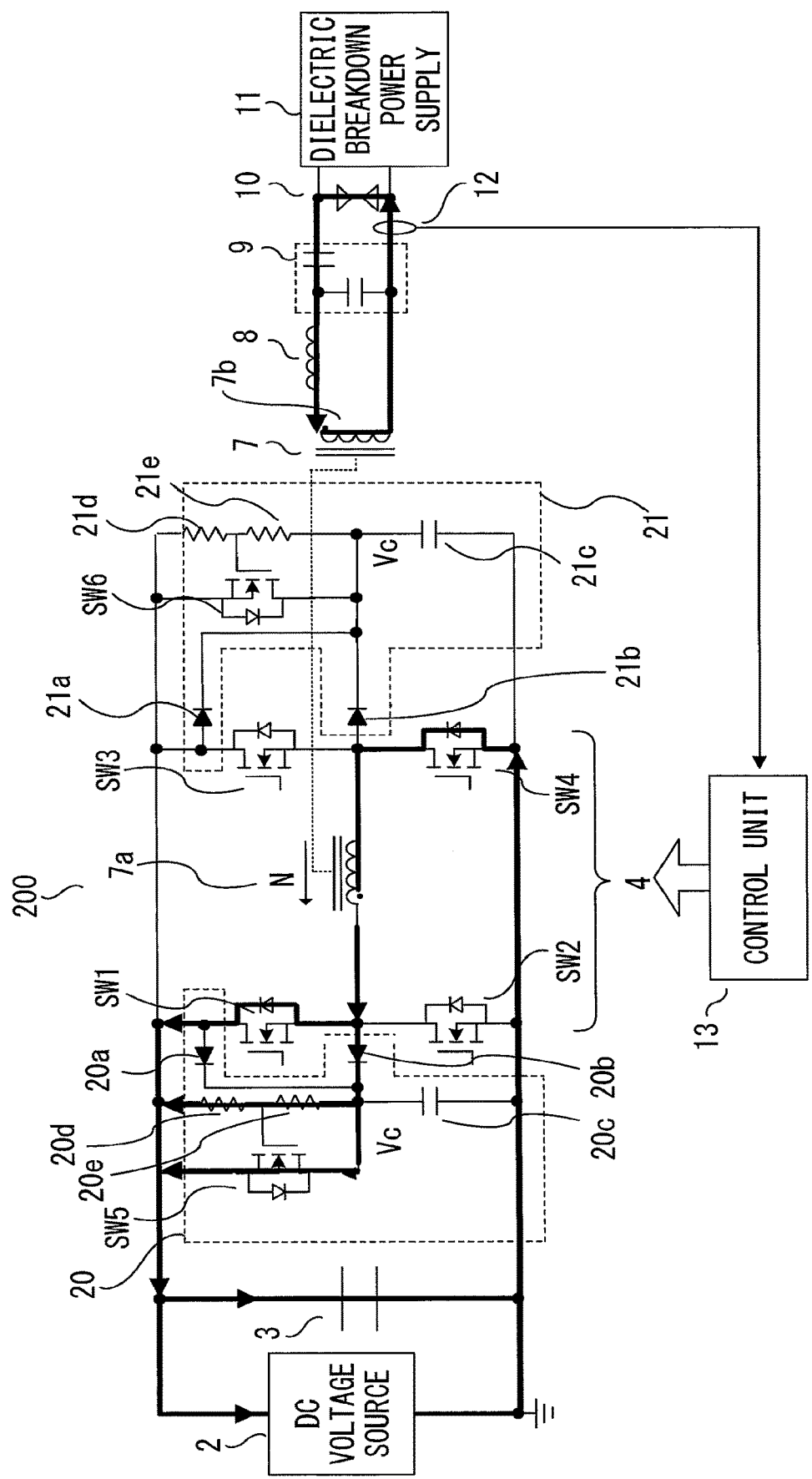
FIG. 18 illustrates the configuration and operation of a resonant inverter according to embodiment 3 of the present invention.

Hereinafter, the resonant inverter of embodiment 3 will be described focusing on difference from embodiment 1, with reference to FIG. 18 which illustrates the configuration and operation and FIG. 19 which illustrates the operation. In FIG. 18, parts that are the same as or correspond to those in FIG. 1 in embodiment 1 are denoted by the same reference characters.

FIG. 18 shows the circuit configuration of a resonant inverter 200 according to embodiment 3, and current flow when the spark plug 10 undergoes dielectric breakdown and capacitance discharge current due to the spark plug 10 and the resonant capacitor 9 flows through the transformer primary winding 7a. It is noted that FIG. 18 shows current flow in the case where the polarity of current flowing through the transformer primary winding 7a is negative. The case where the polarity of current is positive is not shown.

Figure 19:
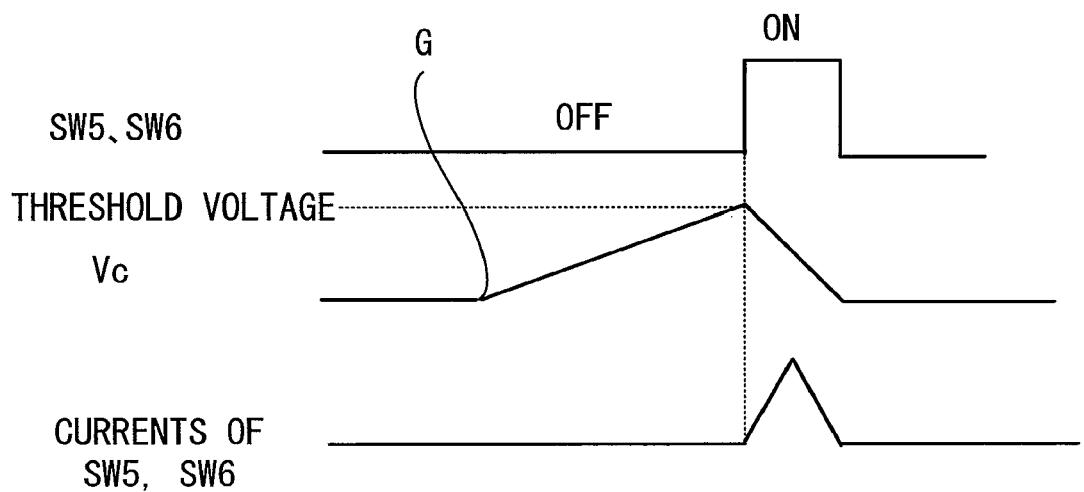
FIG. 19 illustrates the operation of the resonant inverter according to embodiment 3 of the present invention.

FIG. 19 shows the ON/OFF state of the protection switching element, and the relationship between current flowing therethrough and the voltage of the snubber capacitor. In FIG. 19, G indicates "start of flowing of the capacitance discharge current".

First, the configuration of the resonant inverter 200 of embodiment 3 will be described with reference to FIG. 18.

The snubber circuit 5 of embodiment 1 is replaced with a snubber circuit 20, and the snubber circuit 6 is replaced with a snubber circuit 21.

The snubber circuit 20 is composed of a protection switching element SW5, a first regeneration resistor 20d and a second regeneration resistor 20e which are divided two regeneration resistors, a snubber capacitor 20c, and clamp diodes 20a, 20b.

The series circuit of the first regeneration resistor 20d, the second regeneration resistor 20e, and the snubber capacitor 20c is connected in parallel to the series circuit of the switching elements SW1 and SW2 of the inverter 4. The cathodes of the clamp diodes 20a and 20b are connected to the connection point between the second regeneration resistor 20e and the snubber capacitor 20c. The anode of the clamp diode 20a is connected to the drain end of the switching element SW1, and the anode of the clamp diode 20b is connected to the drain end of the switching element SW2.

The drain end and the source end of the protection switching element SW5 are connected in parallel to the series circuit of the first regeneration resistor 20d and the second regeneration resistor 20e, and the gate end of the protection switching element SW5 is connected to the connection point between the first regeneration resistor 20d and the second regeneration resistor 20e.

The configuration of the snubber circuit 21 is the same as that of the snubber circuit 20, and therefore the description thereof is omitted.

Next, operation of the resonant inverter 200 of embodiment 3 will be described with reference to FIG. 18 and FIG. 19.

In the snubber circuit 20, capacitance discharge current flows through the body diode of the switching element SW1, the first regeneration resistor 20d, and the second regeneration resistor 20e. Here, if clamp voltage Vc of the snubber capacitor 20c becomes higher than predetermined voltage, voltage divided by the first regeneration resistor 20d and the second regeneration resistor 20e increases and the protection switching element SW5 is turned on, whereby the amount of regeneration is increased and voltage increase in the snubber capacitor 20c is suppressed. Thus, the dielectric breakdown of the switching elements SW1 to SW4 composing the inverter 4 can be prevented. In addition, the capacitance of the snubber capacitor 20c can be reduced, and since control for the protection switching element SW5 need not be performed by the control unit 13, the control can be simplified.

Operation of the snubber circuit 21 is the same as that of the snubber circuit 20, and therefore the description thereof is omitted.

In embodiment 3, the protection switching elements are added to the snubber circuits of the resonant inverter of embodiment 1. However, the protection switching elements may be added to the snubber circuits of the resonant inverter of embodiment 2. In this case, the switching elements composing the inverter 4 can be more effectively protected.

As described above, the resonant inverter of embodiment 3 is obtained by adding the protection switching elements to the snubber circuits of the resonant inverter of embodiment 1. Therefore, as in the resonant inverter of embodiment 1, it is possible to protect the switching elements composing the inverter from switching surge, reduce switching loss at the time of turning-on, and perform power regeneration of energy stored in the snubber capacitors to the DC voltage source. In addition, it is possible to protect the switching elements from capacitance discharge current, and also, reduce the capacitances of the snubber capacitors.

Embodiment 4

A resonant inverter of embodiment 4 is obtained by adding a filter circuit between the DC voltage source and the input capacitor in the resonant inverter of embodiment 1.

Figure 20:
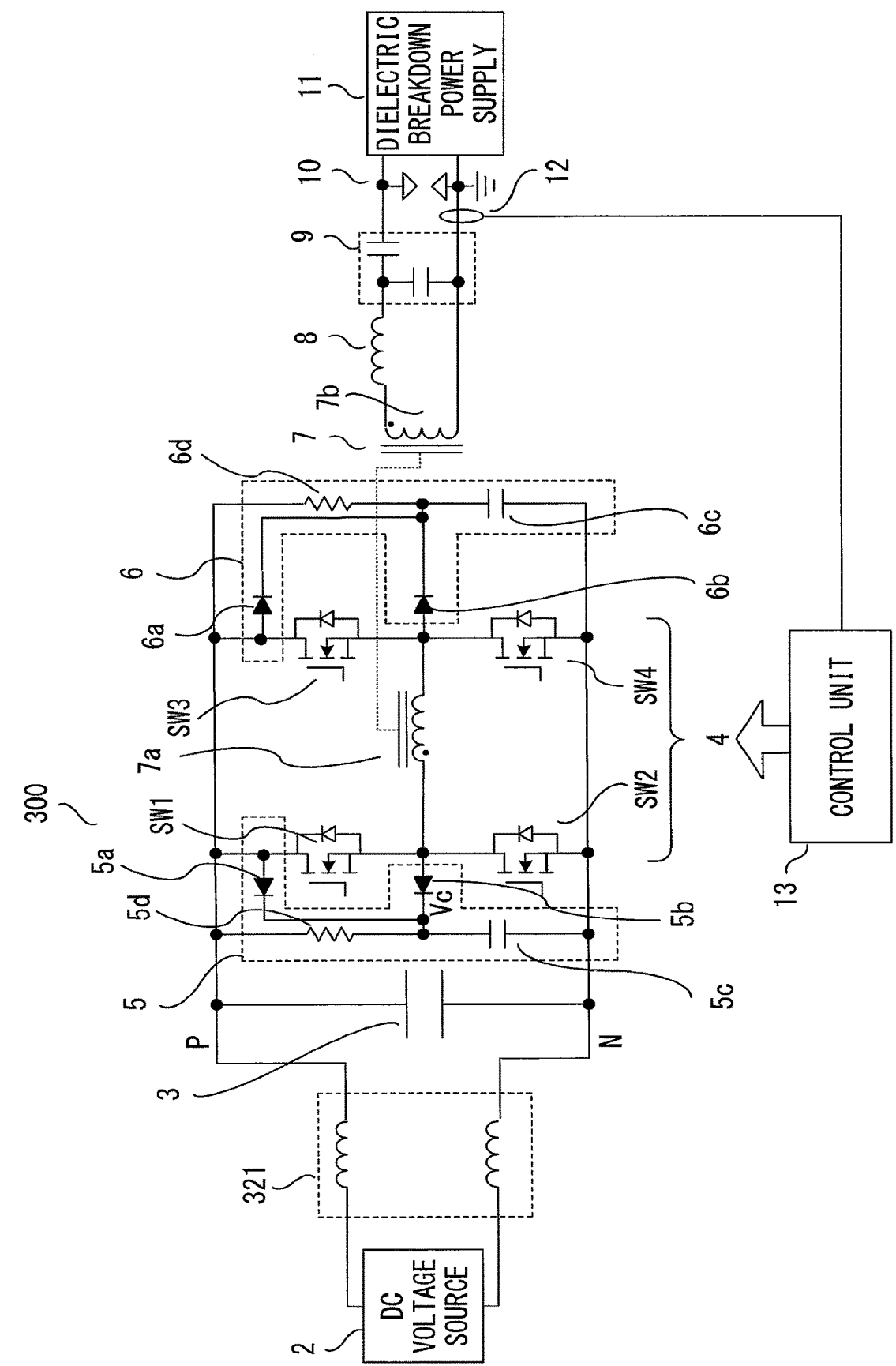
FIG. 20 illustrates the configuration and operation of a resonant inverter according to embodiment 4 of the present invention.
Figure 21:
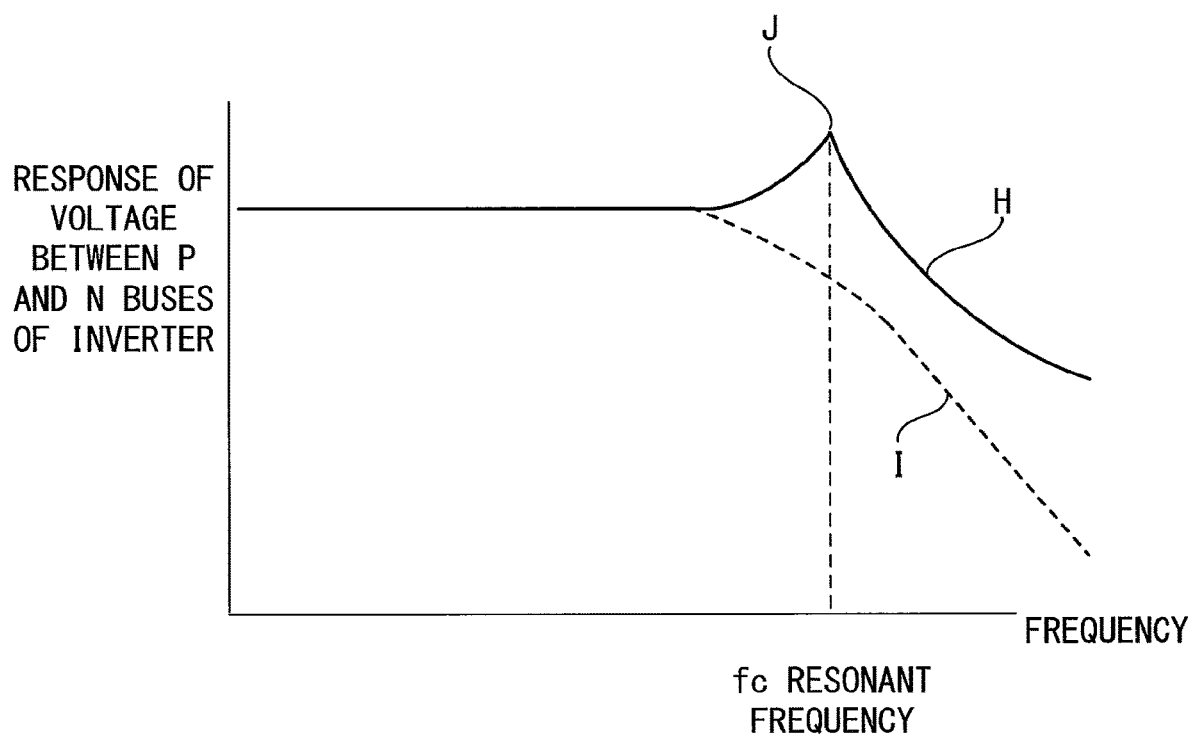
FIG. 21 illustrates the operation of the resonant inverter according to embodiment 4 of the present invention.

Hereinafter, the resonant inverter of embodiment 4 will be described focusing on difference from embodiment 1, with reference to FIG. 20 which illustrates the configuration and operation and FIG. 21 which illustrates the operation. In FIG. 20, parts that are the same as or correspond to those in FIG. 1 in embodiment 1 are denoted by the same reference characters.

In the resonant inverter 300 of embodiment 4, a filter circuit 321 including inductors is added between the DC voltage source 2 and the input capacitor 3.

The purpose of addition of the filter circuit 321 between the DC voltage source 2 and the input capacitor 3 is to prevent noise occurring in the inverter 4 from being transferred to the DC voltage source 2.

However, in the case of adding the filter circuit 321, depending on conditions, resonant voltage may occur due to the input capacitor 3 and the inductance of the filter circuit.

Next, suppression of occurrence of resonant voltage due to addition of the filter circuit 321 will be described with reference to FIG. 21. In FIG. 21, H indicates the "case of no snubber circuit (solid line)", and I indicates the "case of providing the snubber circuit (dotted line)". J indicates "resonant voltage due to the inductance of the filter and the wiring, and the input capacitor".

It is found that resonant voltage occurring between the inductance of the filter circuit 321 and the wiring, and the input capacitor 3, is attenuated by the snubber circuit 5.

Where the resonant frequency of the resonant voltage is denoted by fc and the capacitance of the input capacitor 3 is denoted by C, the impedance of the input capacitor 3 at the resonant point is $1/(2\pi fcC)$. If the sum of the impedances of the snubber capacitor 5c and the regeneration resistor 5d composing the snubber circuit 5 are set to be smaller than the impedance of the input capacitor 3, it is possible to effectively attenuate the resonant voltage as indicated by the dotted line for the case of providing the snubber circuit in FIG. 21.

In embodiment 4, the case of adding the filter circuit between the DC voltage source and the input capacitor in the resonant inverter of embodiment 1 has been described. Similarly, the filter circuit may be added to the resonant inverter of embodiment 2 or embodiment 3, and also in this case, the same effects can be obtained.

As described above, the resonant inverter of embodiment 4 is obtained by adding the filter circuit between the DC voltage source and the input capacitor in the resonant inverter of embodiment 1. Therefore, as in the resonant inverter of embodiment 1, it is possible to protect the switching elements composing the inverter from switching surge, reduce switching loss at the time of turning-on, and perform power regeneration of energy stored in the snubber capacitors to the DC voltage source. In addition, the DC voltage source can be protected from switching surge or capacitance discharge current by addition of the filter circuit, and resonant voltage that may occur due to the addition of the filter circuit can be reduced.

It is noted that, within the scope of the present invention, the above embodiments may be freely combined with each other, or each of the above embodiments may be modified or simplified as appropriate.

INDUSTRIAL APPLICABILITY

The present invention can protect the switching elements composing the inverter from switching surge, reduce switching loss at the time of turning-on, and perform power regeneration of energy stored in the snubber capacitors to the DC voltage source. Therefore, the present invention is widely applicable to high-frequency plasma ignition devices that perform ignition of poor-ignitability combustion engines.

The invention claimed is:

1. A resonant inverter comprising:
an input capacitor that is connected to a DC voltage source;
an inverter that includes a plurality of legs formed by a series circuit of a first switching element and a second switching element, each of the legs being connected in parallel to the DC voltage source;
a snubber circuit formed by a series circuit of a regeneration resistor and a snubber capacitor, one terminal of the snubber circuit being connected to a drain of the first switching element and the other terminal of the snubber circuit being connected to a source of the second switching element;
a first clamp diode connected between a drain of a switching element of the inverter and a connection point between the regeneration resistor and the snubber capacitor of the snubber circuit;
a second clamp diode connected between a drain of the second switching element of the inverter and the connection point between the regeneration resistor and the snubber capacitor of the snubber circuit;
a transformer having a primary winding connected to an AC end of the inverter;
a resonant coil, a resonant capacitor, and a current sensor connected to a secondary winding of the transformer; and
a controller for controlling the inverter, wherein based on a current detected by the current sensor, the controller controls the first switching element of the inverter and the second switching element of the inverter so as to perform zero voltage switching at a time of turning-on, at a frequency at which a load including the resonant coil and the resonant capacitor becomes capacitive, and performs power regeneration of energy stored in the snubber capacitor to the DC voltage source.

2. The resonant inverter according to claim 1, wherein a capacitance discharge current capacitor having a lower impedance and a larger capacitance than those of the snubber capacitor is connected in parallel to the snubber capacitor.

3. The resonant inverter according to claim 2, wherein the regeneration resistor is divided into a first regeneration resistor and a second regeneration resistor, and
a drain and a source of a protection switching element are connected to both ends of a series circuit of the first regeneration resistor and the second regeneration resistor, and a gate of the protection switching element is connected to a connection point between the first regeneration resistor and the second regeneration resistor.

4. The resonant inverter according to claim 3, wherein a filter circuit is interposed between the DC voltage source and the input capacitor.

5. The resonant inverter according to claim 4, wherein a ratio between a number of turns of the primary winding and a number of turns of the secondary winding of the transformer is 1:n, where n is a real number greater than 1, and
current obtained by multiplying current of the secondary winding of the transformer by the turns ratio n of the transformer flows through the primary winding of the transformer.

6. The resonant inverter according to claim 4, wherein the filter circuit is composed of an inductor.

7. The resonant inverter according to claim 3, wherein
a ratio between a number of turns of the primary winding and a number of turns of the secondary winding of the transformer is 1:n, where n is a real number greater than 1, and current obtained by multiplying current of the secondary winding of the transformer by the turns ratio n of the transformer flows through the primary winding of the transformer.

8. The resonant inverter according to claim 2, wherein
a filter circuit is interposed between the DC voltage source and the input capacitor.

9. The resonant inverter according to claim 8, wherein
a ratio between a number of turns of the primary winding and a number of turns of the secondary winding of the transformer is 1:n, where n is a real number greater than 1, and current obtained by multiplying current of the secondary winding of the transformer by the turns ratio n of the transformer flows through the primary winding of the transformer.

10. The resonant inverter according to claim 8, wherein the filter circuit is composed of an inductor.

11. The resonant inverter according to claim 2, wherein a ratio between a number of turns of the primary winding and a number of turns of the secondary winding of the transformer is 1:n, where n is a real number greater than 1, and current obtained by multiplying current of the secondary winding of the transformer by the turns ratio n of the transformer flows through the primary winding of the transformer.

12. The resonant inverter according to claim 1, wherein
the regeneration resistor is divided into a first regeneration resistor and a second regeneration resistor, and a drain and a source of a protection switching element are connected to both ends of a series circuit of the first regeneration resistor and the second regeneration resistor, and a gate of the protection switching element is connected to a connection point between the first regeneration resistor and the second regeneration resistor.

13. The resonant inverter according to claim 12, wherein
a filter circuit is interposed between the DC voltage source and the input capacitor.

14. The resonant inverter according to claim 13, wherein
a ratio between a number of turns of the primary winding and a number of turns of the secondary winding of the transformer is 1:n, where n is a real number greater than 1, and current obtained by multiplying current of the secondary winding of the transformer by the turns ratio n of the transformer flows through the primary winding of the transformer.

15. The resonant inverter according to claim 13, wherein the filter circuit is composed of an inductor.

16. The resonant inverter according to claim 12, wherein
a ratio between a number of turns of the primary winding and a number of turns of the secondary winding of the transformer is 1:n, where n is a real number greater than 1, and current obtained by multiplying current of the secondary winding of the transformer by the turns ratio n of the transformer flows through the primary winding of the transformer.

17. The resonant inverter according to claim 1, wherein
a filter circuit is interposed between the DC voltage source and the input capacitor.

18. The resonant inverter according to claim 17, wherein the filter circuit is composed of an inductor.

19. The resonant inverter according to claim 17, wherein
a ratio between a number of turns of the primary winding and a number of turns of the secondary winding of the transformer is 1:n, where n is a real number greater than 1, and current obtained by multiplying current of the secondary winding of the transformer by the turns ratio n of the transformer flows through the primary winding of the transformer.

20. The resonant inverter according to claim 1, wherein
a ratio between a number of turns of the primary winding and a number of turns of the secondary winding of the transformer is 1:n, where n is a real number greater than 1, and current obtained by multiplying current of the secondary winding of the transformer by the turns ratio n of the transformer flows through the primary winding of the transformer.

* * * * *